US009472230B1

United States Patent
Sasaki et al.

(10) Patent No.: US 9,472,230 B1
(45) Date of Patent: Oct. 18, 2016

(54) PLASMON GENERATOR INCLUDING A MAIN BODY AND A FRONT PROTRUSION

(71) Applicants: Yoshitaka Sasaki, Santa Clara, CA (US); Hiroyuki Ito, Milpitas, CA (US); Shigeki Tanemura, Milpitas, CA (US); Hideo Mamiya, Milpitas, CA (US); Hironori Araki, Milpitas, CA (US); Seiichiro Tomita, Milpitas, CA (US)

(72) Inventors: Yoshitaka Sasaki, Santa Clara, CA (US); Hiroyuki Ito, Milpitas, CA (US); Shigeki Tanemura, Milpitas, CA (US); Hideo Mamiya, Milpitas, CA (US); Hironori Araki, Milpitas, CA (US); Seiichiro Tomita, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 14/691,127

(22) Filed: Apr. 20, 2015

(51) Int. Cl.
| | |
|---|---|
| *G11B 11/00* | (2006.01) |
| *G11B 7/1387* | (2012.01) |
| *G11B 7/22* | (2006.01) |
| *G11B 5/012* | (2006.01) |
| *G11B 5/00* | (2006.01) |
| *G11B 5/60* | (2006.01) |
| *G11B 5/31* | (2006.01) |
| *G11B 11/105* | (2006.01) |

(52) U.S. Cl.
CPC ............ *G11B 7/1387* (2013.01); *G11B 5/012* (2013.01); *G11B 7/22* (2013.01); *G11B 5/314* (2013.01); *G11B 5/6088* (2013.01); *G11B 11/10532* (2013.01); *G11B 11/10543* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,456,968 B1* | 6/2013 | Sasaki ................. | G11B 5/3136 369/13.13 |
| 2004/0062477 A1* | 4/2004 | Tanaka ................. | B82Y 20/00 385/31 |
| 2009/0202190 A1* | 8/2009 | Tanaka ................. | B82Y 20/00 385/11 |
| 2011/0170381 A1* | 7/2011 | Matsumoto .......... | G11B 5/1278 369/13.33 |
| 2011/0205660 A1* | 8/2011 | Komura ................ | B82Y 20/00 369/13.33 |
| 2011/0205661 A1* | 8/2011 | Komura ................ | B82Y 20/00 369/13.33 |
| 2011/0222184 A1* | 9/2011 | Komura ................ | B82Y 20/00 369/13.33 |
| 2012/0257304 A1* | 10/2012 | Sasaki ................. | G11B 5/1278 360/123.12 |
| 2013/0033972 A1* | 2/2013 | Hara .................... | G11B 5/314 369/13.33 |
| 2015/0255096 A1* | 9/2015 | Sasaki ................. | G11B 5/4866 369/13.33 |
| 2015/0332717 A1* | 11/2015 | Hara .................... | G11B 5/6082 369/13.33 |

* cited by examiner

*Primary Examiner* — Tan X Dinh
(74) *Attorney, Agent, or Firm* — Oliff PLC

(57) ABSTRACT

A plasmon generator includes a main body, and a front protrusion protruding from the main body. The front protrusion has a proximal portion which is a boundary with the main body, and a near-field light generating surface located in the medium facing surface of a magnetic head. The main body has a first inclined surface and a second inclined surface each facing toward the medium facing surface. The first inclined surface and the second inclined surface are at a distance from each other and aligned in the track width direction. The proximal portion of the front protrusion is located between the first inclined surface and the second inclined surface.

20 Claims, 27 Drawing Sheets

PLASMON GENERATOR INCLUDING A MAIN BODY AND A FRONT PROTRUSION

BACKGROUND OF THE INVENTION

1. Field of the Invention

The present invention relates to a thermally-assisted magnetic recording head for use in thermally-assisted magnetic recording to write data on a recording medium with the coercivity thereof lowered by irradiating the recording medium with near-field light.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head unit including a magnetoresistive element (hereinafter, also referred to as MR element) for reading and a write head unit including an induction-type electromagnetic transducer for writing are stacked on a substrate. In a magnetic disk drive, the thin-film magnetic head is mounted on a slider configured to slightly fly above the surface of a recording medium. The slider has a medium facing surface configured to face the recording medium. The medium facing surface has an air inflow end (a leading end) and an air outflow end (a trailing end).

Here, the side of the positions closer to the leading end relative to a reference position will be referred to as the leading side, and the side of the positions closer to the trailing end relative to the reference position will be referred to as the trailing side. The leading side is the rear side in the direction of travel of the recording medium relative to the slider. The trailing side is the front side in the direction of travel of the recording medium relative to the slider.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To eliminate this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To resolve the foregoing problems, there has been proposed a technology called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating near-field light is typically guided through a waveguide, which is provided in the slider, to the plasmon generator disposed near the medium facing surface of the slider.

U.S. Patent Application Publication No. 2011/0170381 A1 discloses a thermally-assisted magnetic recording head including a main pole, a waveguide and a plasmon generator. The main pole has an end face located in the medium facing surface, and produces a write magnetic field from the end face. The plasmon generator has a near-field light generating surface located in the medium facing surface. The waveguide includes a core and a cladding. In this head, the surface of the core and the surface of the plasmon generator face each other with a gap interposed therebetween. This head is configured to excite surface plasmons on the plasmon generator by using evanescent light that occurs on the surface of the core based on the light propagating through the core, and to cause near-field light to be generated from the near-field light generating surface based on the excited surface plasmons.

A thermally-assisted magnetic recording head suffers from the problem that heat generated by the plasmon generator causes the plasmon generator to shrink and become distant from the medium facing surface, and also causes the main pole to be corroded, which result in a shorter life of the thermally-assisted magnetic recording head.

In order to achieve higher recording density, it is essential to make the track width smaller. Making the track width smaller increases the track density. A thermally-assisted magnetic recording head including a plasmon generator allows the plasmon generator to form a spot of near-field light on a recording medium. The size of the spot of near-field light will hereinafter be referred to as light spot size. It has conventionally been considered that a smaller light spot size is effective for achieving higher recording density. In order to make the light spot size smaller, it is effective to reduce the width of the near-field light generating surface of the plasmon generator.

U.S. Patent Application Publication No. 2011/0170381 A1 discloses a plasmon generator including a narrow portion and a wide portion. The narrow portion includes the near-field light generating surface located in the medium facing surface. The wide portion is located farther from the medium facing surface than is the narrow portion. Here, we define a neck height as the length of the narrow portion in a direction perpendicular to the medium facing surface. In the plasmon generator disclosed in U.S. Patent Application Publication No. 2011/0170381 A1, heat generated at the narrow portion, particularly at the near-field light generating surface, may cause the narrow portion to shrink and become distant from the medium facing surface, and consequently cause the plasmon generator to become unable to form a sport of near-field light on a recording medium. A conceivable countermeasure to prevent this is to reduce the neck height. Reducing the neck height can enhance the heat sink effect of the wide portion to dissipate the heat generated at the narrow portion. Reducing the neck height can also increase the efficiency of generation of near-field light.

Conventionally, however, any attempts to reduce the neck height have resulted in difficulty in accurately controlling the width of the near-field light generating surface.

OBJECT AND SUMMARY OF THE INVENTION

It is an object of the present invention to provide a plasmon generator allowing for enhancement of the efficiencies of heat dissipation and generation of near-field light, and also allowing for accurate control of the width of the near-field light generating surface, and to provide a thermally-assisted magnetic recording head including such a plasmon generator.

A plasmon generator of the present invention includes a main body, and a front protrusion protruding from the main body. The front protrusion has a proximal portion which is a boundary with the main body, and a near-field light generating surface which is a protruding end. The main body has a first inclined surface and a second inclined surface each facing toward a first imaginary plane including the near-field light generating surface. The first inclined surface and the second inclined surface are at a distance from each other and aligned in a first direction parallel to the first imaginary plane.

Each of the first inclined surface and the second inclined surface has a first edge located at a smallest distance from the first imaginary plane, and a second edge located at a largest distance from the first imaginary plane. The first edge of the first inclined surface and the first edge of the second inclined surface are located on a first imaginary straight line extending in the first direction. The second edge of the first inclined surface and the second edge of the second inclined surface are located on a second imaginary straight line extending in the first direction. Each of the first inclined surface and the second inclined surface is inclined with respect to both of the first imaginary plane and a second imaginary plane, the second imaginary plane including the first imaginary straight line and being perpendicular to the first imaginary plane. The proximal portion of the front protrusion is located between the first inclined surface and the second inclined surface. The plasmon generator is configured to excite a surface plasmon on the main body based on light, and to generate near-field light from the near-field light generating surface of the front protrusion based on the surface plasmon.

In the plasmon generator of the present invention, the main body may have a top surface, and a plasmon exciting section located opposite to the top surface, the top surface including the second edge of each of the first and second inclined surfaces, the plasmon exciting section being configured to excite a surface plasmon thereon. In such a case, the main body may include a lower protrusion located on a side of the second imaginary plane opposite from the top surface. The lower protrusion includes the plasmon exciting section, and has a front end face facing toward the first imaginary plane and not included in the first imaginary plane. The front end face of the lower protrusion may be inclined with respect to both of the first imaginary plane and the second imaginary plane. In such a case, the front end face has a third edge located at a smallest distance from each of the first imaginary plane and the second imaginary plane, and a fourth edge located at a largest distance from each of the first imaginary plane and the second imaginary plane. The front end face of the lower protrusion may be parallel to the first imaginary plane.

In the plasmon generator of the present invention, the first imaginary straight line may be located at a distance from the first imaginary plane or be included in the first imaginary plane.

In the plasmon generator of the present invention, a straight line that connects two points on each of the first and second inclined surfaces may form an angle of 30° to 70° with respect to the second imaginary plane, the two points being located in a third imaginary plane perpendicular to the first imaginary plane and the second imaginary plane.

In the plasmon generator of the present invention, each of the first and second inclined surfaces may be a single plane or may include a plurality of planar portions that form different angles with respect to the second imaginary plane.

In the plasmon generator of the present invention, at least part of each of the first and second inclined surfaces may be curved.

A thermally-assisted magnetic recording head of the present invention includes: a medium facing surface configured to face a recording medium; a coil; a main pole having an end face located in the medium facing surface; a waveguide; and the plasmon generator of the present invention. The coil produces a magnetic field corresponding to data to be written on the recording medium. The waveguide includes a core and a cladding, the core allowing light to propagate therethrough, the cladding being provided around the core.

The main pole is configured to pass a magnetic flux corresponding to the magnetic field produced by the coil, and to produce from the end face a write magnetic field for use to write data on the recording medium. The near-field light generating surface of the front protrusion of the plasmon generator is located in the medium facing surface. The medium facing surface is included in the first imaginary plane. The plasmon generator is configured to excite a surface plasmon on the main body based on the light propagating through the core.

In the thermally-assisted magnetic recording head of the present invention, the core may have an evanescent light generating surface for generating evanescent light based on the light propagating through the core. The main body of the plasmon generator may have a top surface, and a plasmon exciting section located opposite to the top surface, the top surface including the second edge of each of the first and second inclined surfaces, the plasmon exciting section facing the evanescent light generating surface with a predetermined spacing therefrom. The plasmon exciting section is configured so that a surface plasmon is excited on the plasmon exciting section through coupling with the evanescent light generated by the evanescent light generating surface.

The main body of the plasmon generator may include a lower protrusion located on a side of the second imaginary plane opposite from the top surface. The lower protrusion includes the plasmon exciting section, and has a front end face facing toward the first imaginary plane and not included in the first imaginary plane.

A manufacturing method for the plasmon generator of the present invention includes the steps of forming an initial plasmon generator; forming a first mask on the initial plasmon generator, the first mask being intended for defining the width of the front protrusion in the first direction; forming a second mask on the initial plasmon generator and the first mask, the second mask being intended for defining the location of the first and second inclined surfaces; etching the initial plasmon generator using the first and second masks so that the first and second inclined surfaces and an initial front protrusion are formed; and forming the near-field light generating surface so that the initial front protrusion becomes the front protrusion and the initial plasmon generator becomes the plasmon generator.

In the plasmon generator manufactured by the manufacturing method of the present invention, the main body may have a top surface, and a plasmon exciting section located opposite to the top surface, the top surface including the second edge of each of the first and second inclined surfaces, the plasmon exciting section being configured to excite a surface plasmon thereon. The main body may include a lower protrusion located on a side of the second imaginary plane opposite from the top surface. The lower protrusion includes the plasmon exciting section, and has a front end face facing toward the first imaginary plane and not included in the first imaginary plane. In such a case, the initial plasmon generator is formed to include an initial lower protrusion which will later become the lower protrusion. The initial lower protrusion has an initial front end face which will later become the front end face.

Where the main body of the plasmon generator includes the lower protrusion, the manufacturing method for the plasmon generator of the present invention may further include the step of forming an underlying section before the initial plasmon generator is formed. The underlying section includes a base portion, and an upward protrusion protruding upward from the base portion. The base portion has a top surface. The upward protrusion has a reference surface. The initial plasmon generator is formed over the base portion and the upward protrusion of the underlying section such that the plasmon exciting section contacts the top surface of the base portion and the initial front end face contacts the reference surface of the upward protrusion.

The reference surface of the upward protrusion may have at least one edge parallel to the first imaginary plane. In such a case, in the step of etching the initial plasmon generator, the location of at least one of the first and second edges of each of the first and second inclined surfaces may be controlled by using the at least one edge of the reference surface of the upward protrusion as a reference.

The manufacturing method for the plasmon generator of the present invention may further include the step of forming an indicator before the initial plasmon generator is formed. The indicator is located at a predetermined distance of zero or more from the first imaginary plane. In such a case, in the step of etching the initial plasmon generator, the location of at least one of the first and second edges of each of the first and second inclined surfaces is controlled by using the indicator as a reference.

In the manufacturing method for the plasmon generator of the present invention, the step of etching the initial plasmon generator may employ ion beam etching to etch the initial plasmon generator.

For the plasmon generator of the present invention, it is possible that the first edge of each of the first and second inclined surfaces is located at a small distance from the medium facing surface while the second edge of each of the first and second inclined surfaces is located at a relatively large distance from the medium facing surface. By virtue of such a configuration, the present invention makes it possible to provide a plasmon generator that allows for enhancement of the efficiencies of heat dissipation and generation of near-field light, and also allows for accurate control of the width of the near-field light generating surface, and to provide a thermally-assisted magnetic recording head including such a plasmon generator.

Other and further objects, features and advantages of the present invention will appear more fully from the following description.

DETAILED DESCRIPTION OF THE PREFERRED EMBODIMENTS

First Embodiment

Figure 5:
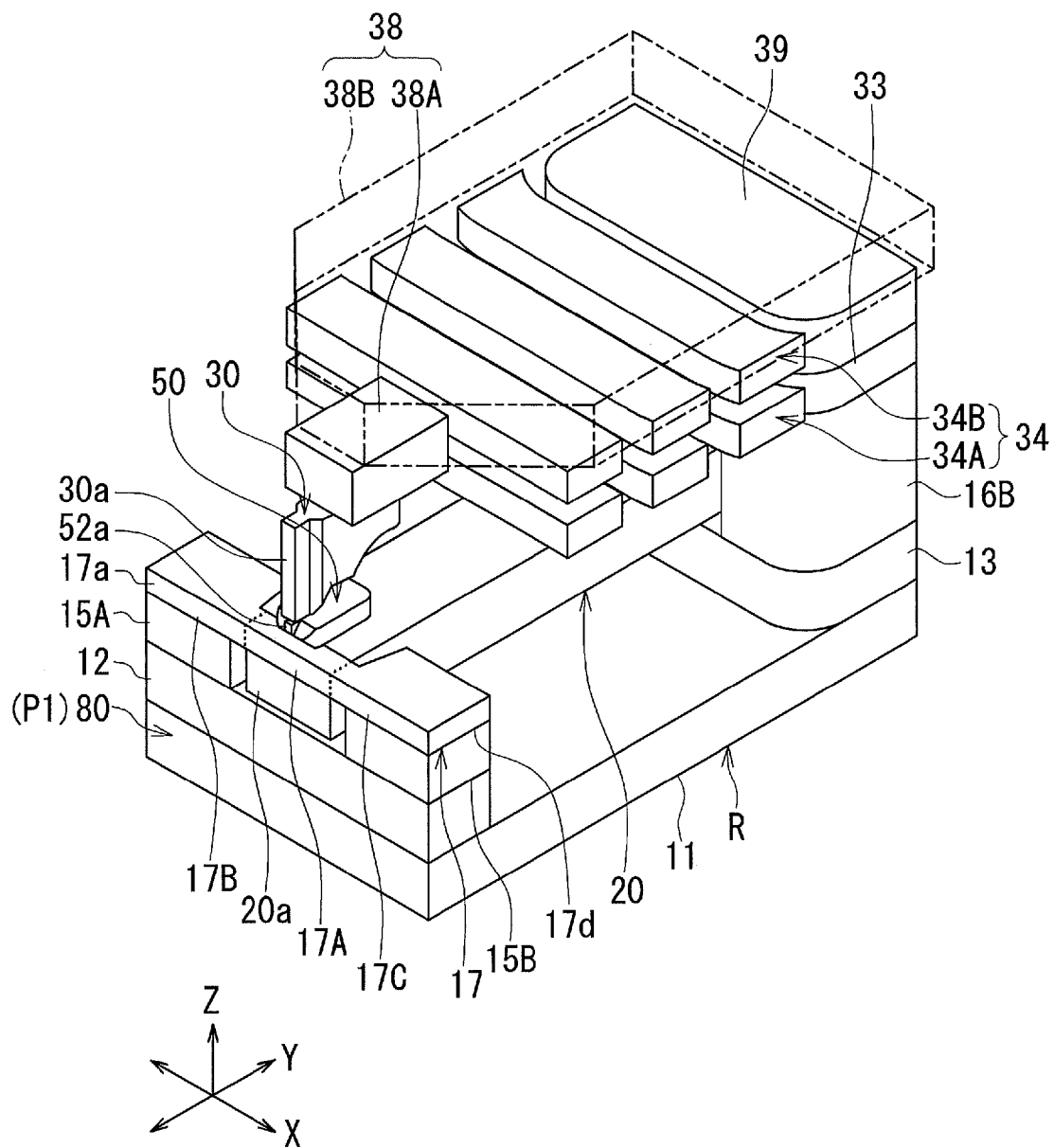
FIG. 5 is a perspective view showing the main part of a thermally-assisted magnetic recording head according to the first embodiment of the invention.
Figure 6:
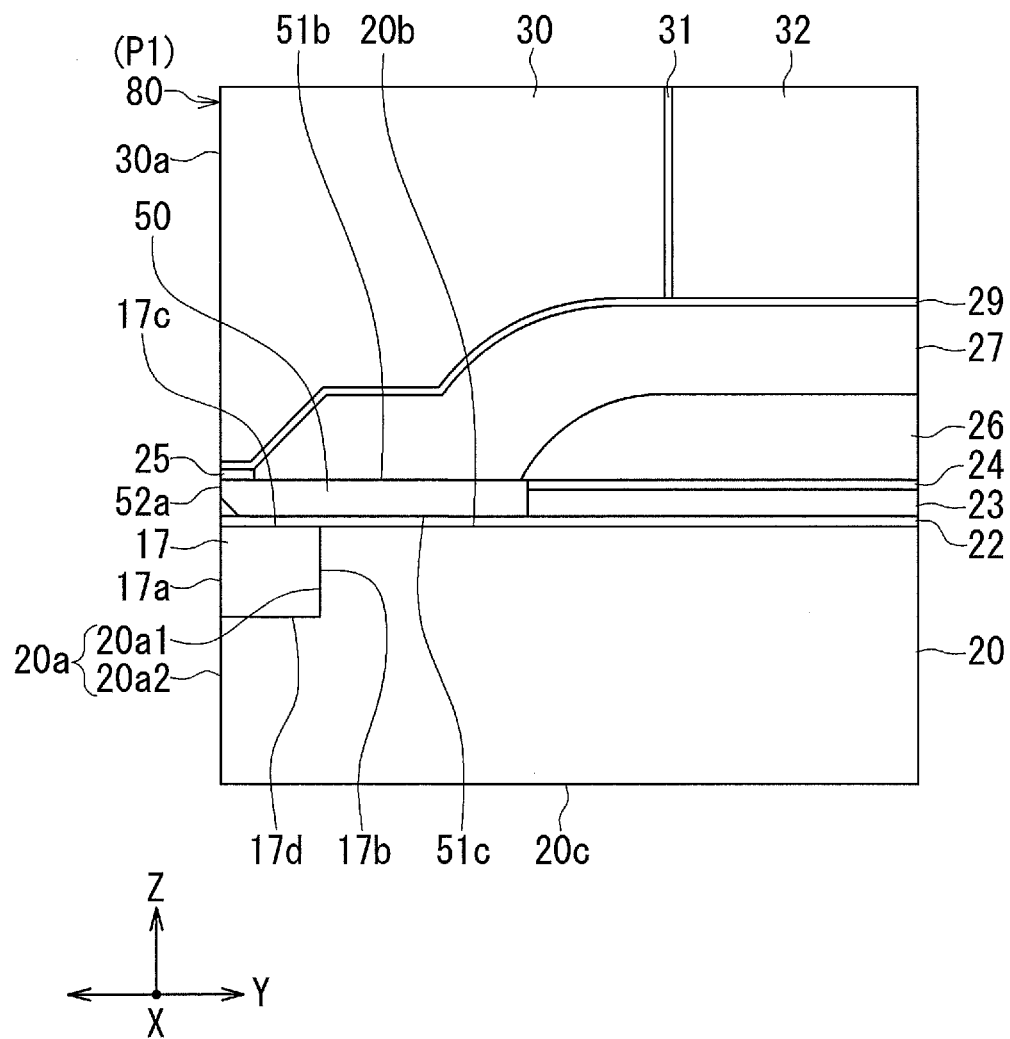
FIG. 6 is a cross-sectional view showing the main part of the thermally-assisted magnetic recording head according to the first embodiment of the invention.
Figure 7:
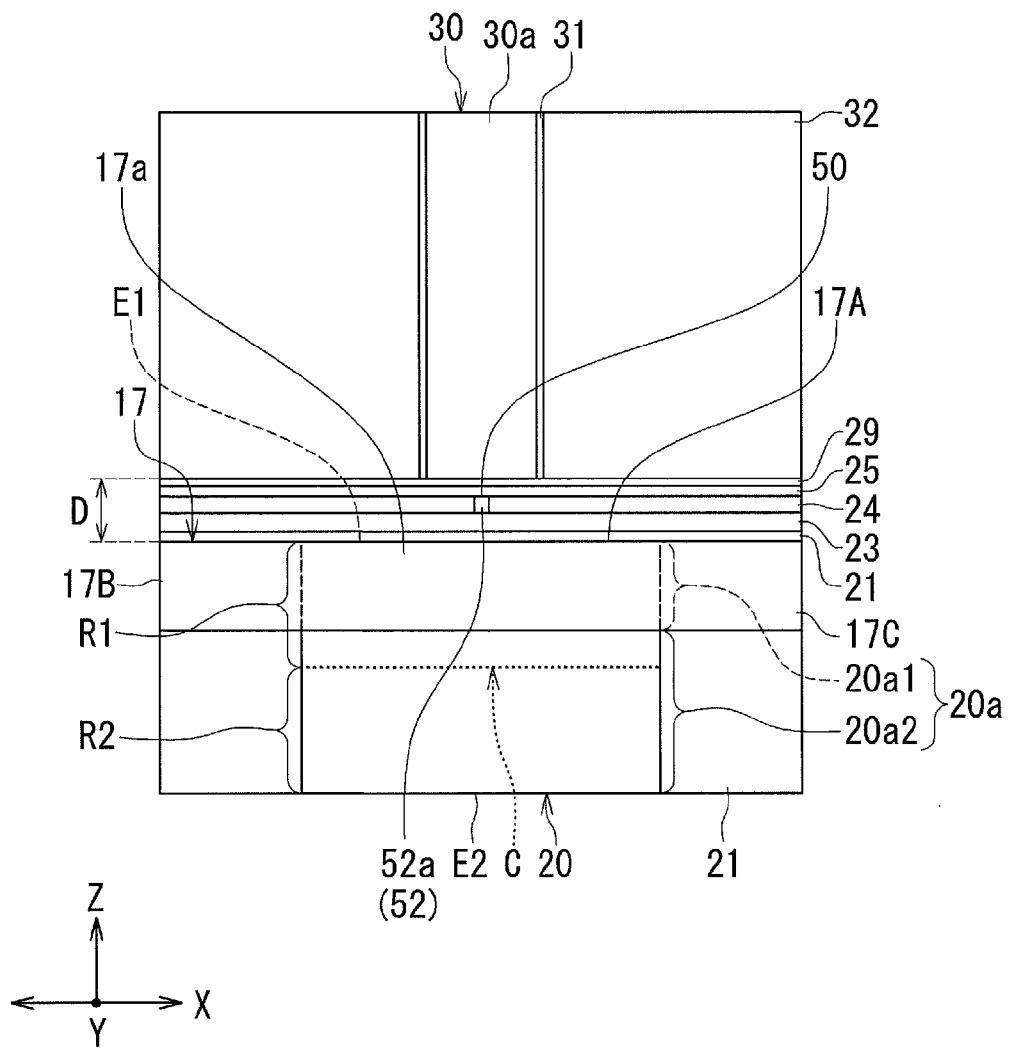
FIG. 7 is a front view showing the main part of the thermally-assisted magnetic recording head according to the first embodiment of the invention.
Figure 8:
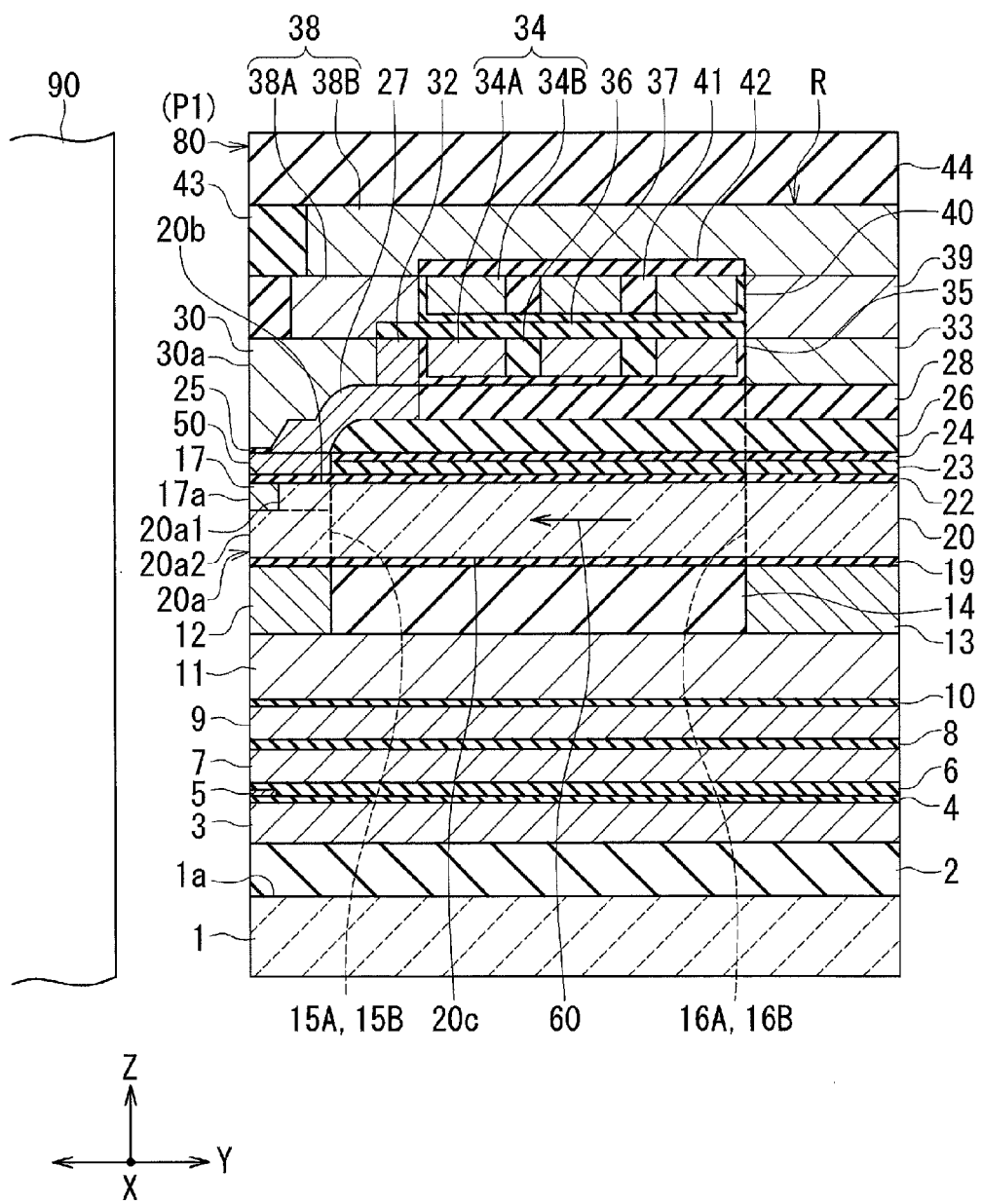
FIG. 8 is a cross-sectional view showing the configuration of the thermally-assisted magnetic recording head according to the first embodiment of the invention.
Figure 9:
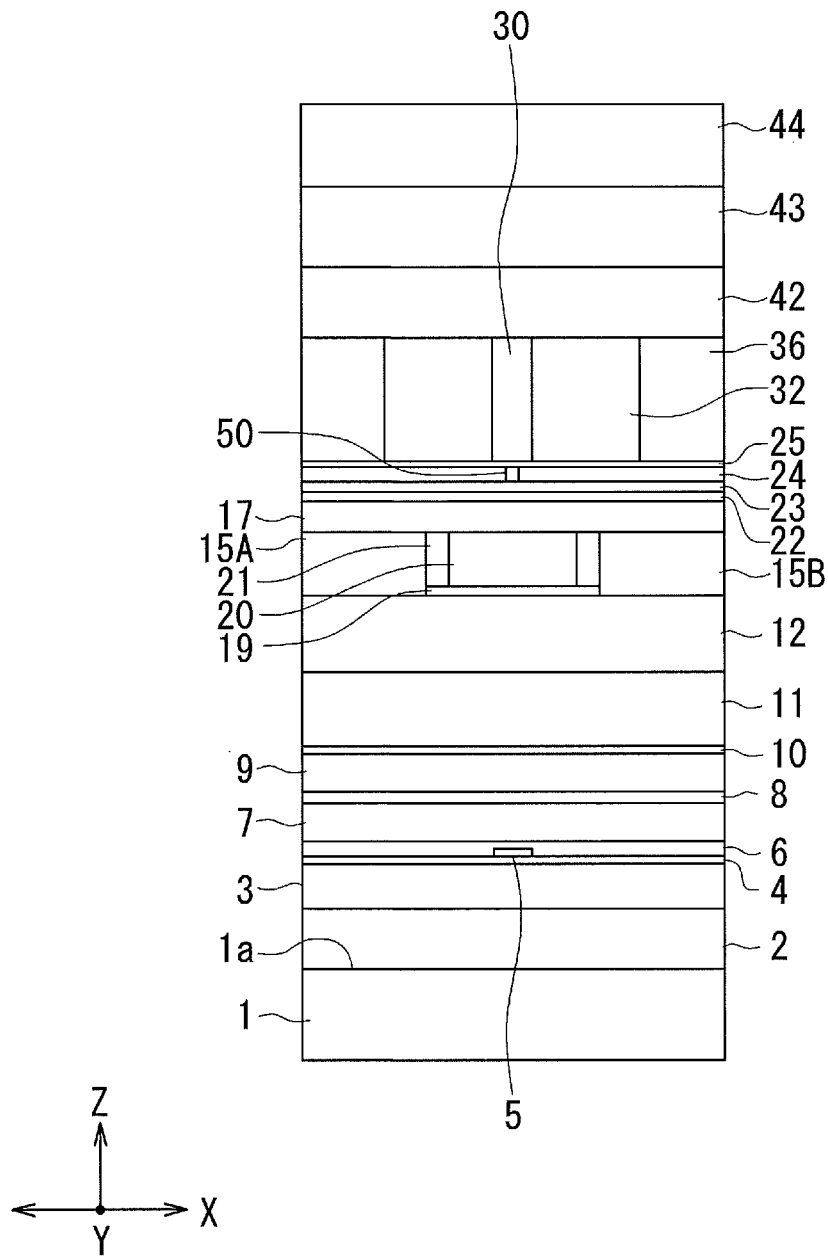
FIG. 9 is a front view showing the medium facing surface of the thermally-assisted magnetic recording head according to the first embodiment of the invention.
Figure 10:
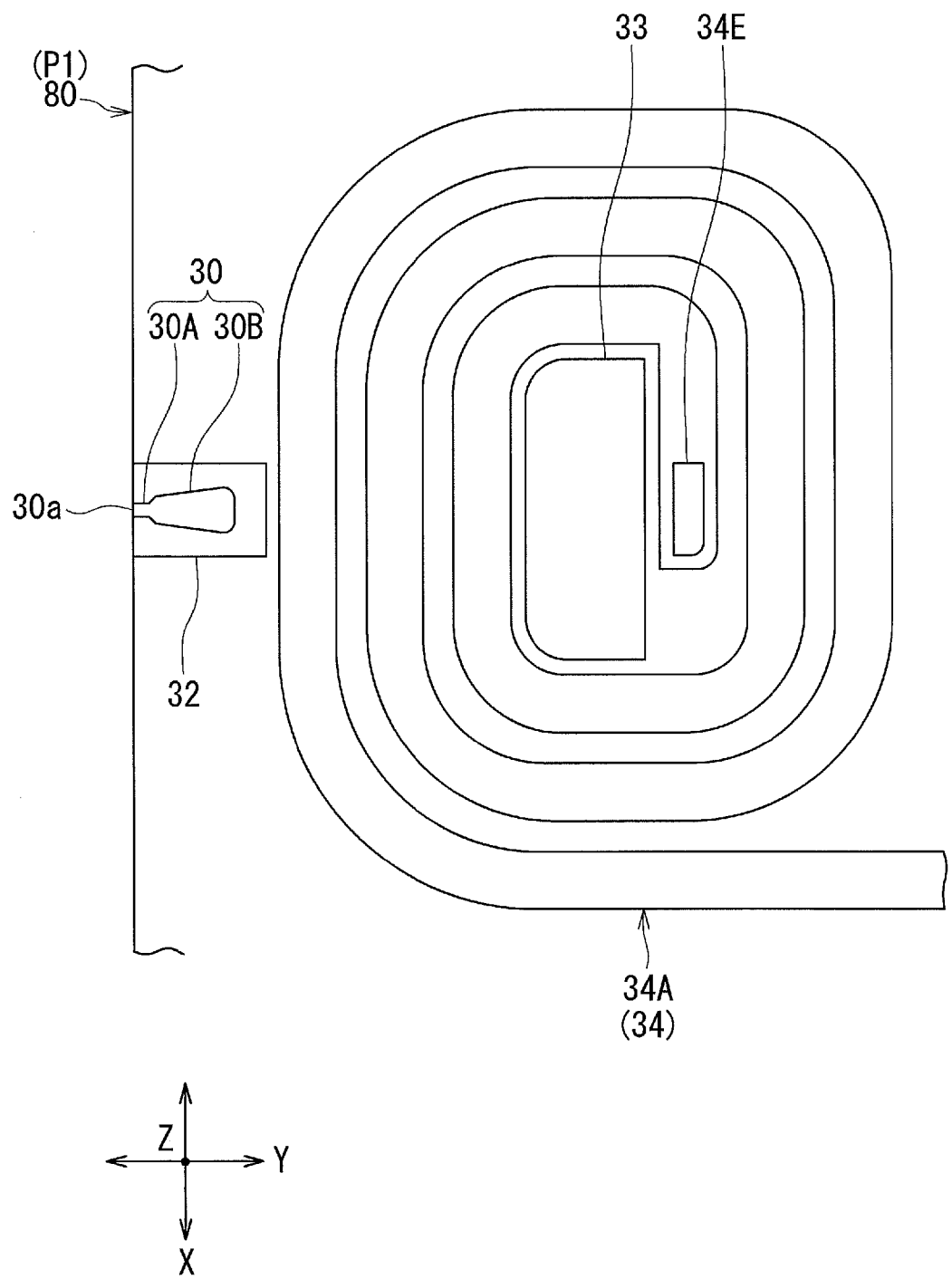
FIG. 10 is a plan view showing a first layer of a coil of the first embodiment of the invention.
Figure 11:
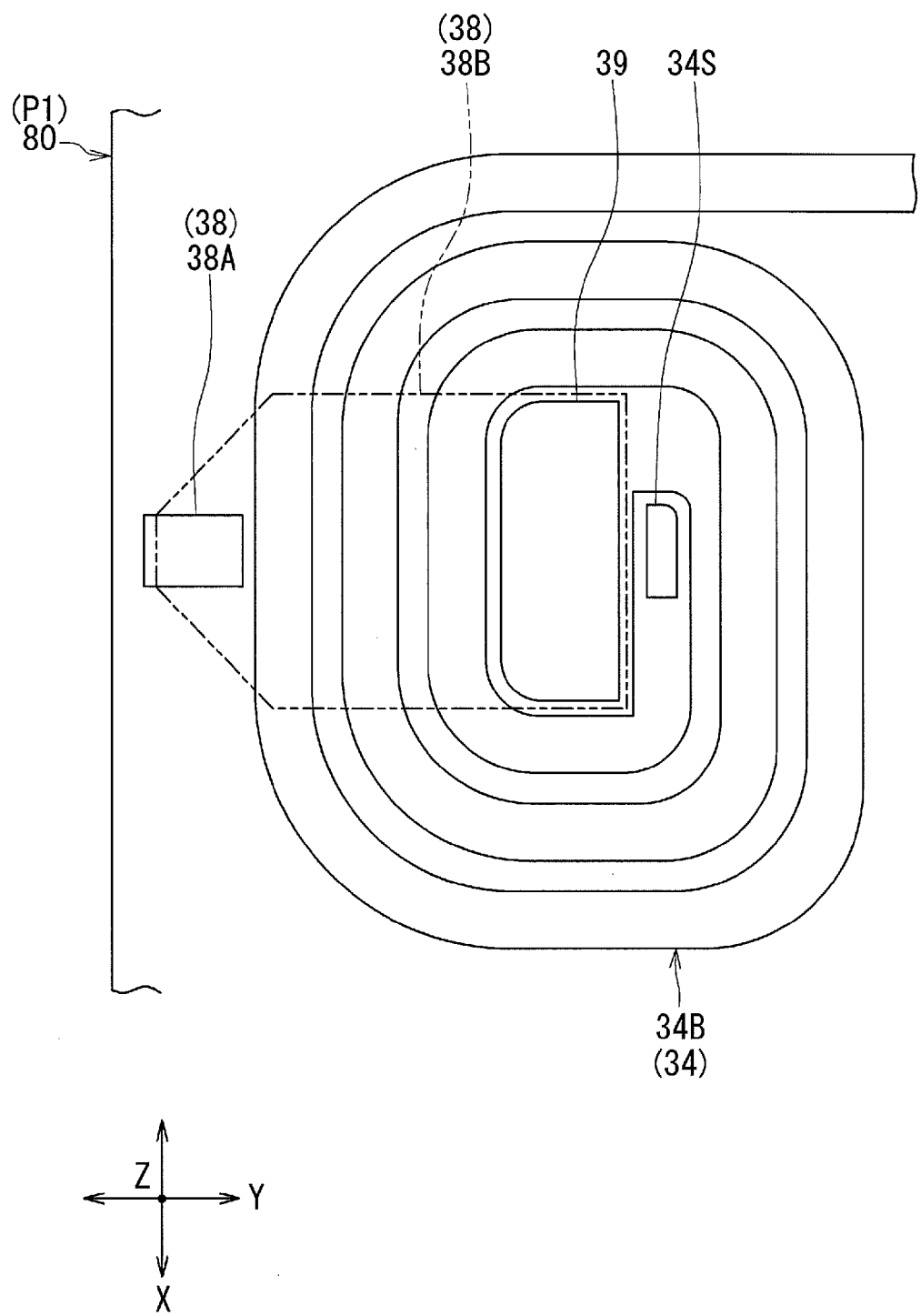
FIG. 11 is a plan view showing a second layer of the coil of the first embodiment of the invention.

Preferred embodiments of the present invention will now be described in detail with reference to the drawings. First, reference is made to FIG. 5 to FIG. 11 to describe the configuration of a thermally-assisted magnetic recording head according to a first embodiment of the invention. FIG. 5 is a perspective view showing the main part of the thermally-assisted magnetic recording head. FIG. 6 is a cross-sectional view showing the main part of the thermally-assisted magnetic recording head. FIG. 7 is a front view showing the main part of the thermally-assisted magnetic recording head. FIG. 8 is a cross-sectional view showing the configuration of the thermally-assisted magnetic recording head. FIG. 9 is a front view showing the medium facing surface of the thermally-assisted magnetic recording head. FIG. 10 is a plan view showing a first layer of a coil of the present embodiment. FIG. 11 is a plan view showing a second layer of the coil of the present embodiment.

The thermally-assisted magnetic recording head according to the present embodiment is intended for use in perpendicular magnetic recording, and is incorporated in a slider configured to fly over the surface of a rotating recording medium. The slider has a medium facing surface 80 configured to face a recording medium 90. When the recording medium 90 rotates, an airflow passing between the recording medium 90 and the slider causes a lift to be exerted on the slider. The lift causes the slider to fly over the surface of the recording medium 90.

As shown in FIG. 8, the thermally-assisted magnetic recording head has the medium facing surface 80. Here, we define X direction, Y direction, and Z direction as follows. The X direction is the direction across the tracks of the recording medium 90, i.e., the track width direction. The Y direction is a direction perpendicular to the medium facing surface 80. The Z direction is the direction of travel of the recording medium 90 as viewed from the slider. The X, Y, and Z directions are orthogonal to one another.

As shown in FIG. 8 and FIG. 9, the thermally-assisted magnetic recording head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a bottom shield layer 3 formed of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not illustrated) connected to the MR element 5; a top shield gap film 6 which is an insulating film disposed on the MR element 5; and a top shield layer 7 formed of a magnetic material and disposed on the top shield gap film 6. The Z direction is also a direction perpendicular to the top surface 1a of the substrate 1.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the bottom shield layer 3 to the top shield layer 7 constitute a read head unit. The thermally-assisted magnetic recording head further includes an insulating layer 8 disposed on the top shield layer 7, a middle shield layer 9 formed of a magnetic material and disposed on the insulating layer 8, a nonmagnetic layer 10 formed of a nonmagnetic material and disposed on the middle shield layer 9, and a write head unit disposed on the nonmagnetic layer 10. The middle shield layer 9 has the function of shielding the MR element 5 from magnetic fields generated in the write head unit. The insulating layer 8 and the nonmagnetic layer 10 are formed of alumina, for example.

The write head unit includes a coil 34 and a main pole 30. The coil 34 produces a magnetic field corresponding to data to be written on the recording medium 90. As shown in FIGS. 6 to 8, the main pole 30 has an end face 30a located in the medium facing surface 80. The main pole 30 is configured to pass a magnetic flux corresponding to the magnetic field produced by the coil 34, and to produce from the end face 30a a write magnetic field for use to write data on the recording medium 90 by means of a perpendicular magnetic recording system. The coil 34 is formed of a conductive material such as copper.

The write head unit further includes a shield 17. The shield 17 is formed of a magnetic metal. As shown in FIGS. 6 to 8, the shield 17 has an end face 17a located in the medium facing surface 80.

The write head unit further includes a return path section R formed of a magnetic material. The return path section R connects the main pole 30 and the shield 17 to each other, and passes a magnetic flux corresponding to the magnetic field produced by the coil 34. The return path section R includes a return pole layer 11, coupling layers 12, 13, 33 and 39, two first coupling sections 15A and 15B, two second coupling sections 16A and 16B, and a first yoke portion 38. The return pole layer 11 lies on the nonmagnetic layer 10. The return pole layer 11 has an end face located in the medium facing surface 80. The write head unit further includes a non-illustrated insulating layer provided around the return pole layer 11. The non-illustrated insulating layer is formed of alumina, for example.

The coupling layer 12 lies on a first portion of the top surface of the return pole layer 11, the first portion being near the medium facing surface 80. The coupling layer 13 lies on a second portion of the top surface of the return pole layer 11, the second portion being located away from the medium facing surface 80. The coupling layer 12 has an end face located in the medium facing surface 80. The write head unit further includes an insulating layer 14 lying on the non-illustrated insulating layer and a portion of the top surface of the return pole layer 11 other than the first and second portions. The insulating layer 14 is formed of alumina, for example.

The two first coupling sections 15A and 15B are disposed on the coupling layer 12. The first coupling section 15A and the first coupling section 15B are arranged to be adjacent in the track width direction (the X direction). The shield 17 lies over the two first coupling sections 15A and 15B. The shield 17 is shaped to be greater in dimension in the track width direction (the X direction) than in dimension in the direction perpendicular to the top surface 1a of the substrate 1 (the Z direction).

The two second coupling sections 16A and 16B are disposed on the coupling layer 13. Each of the second coupling sections 16A and 16B includes a first layer lying on the coupling layer 13, and a second layer lying on the first layer. The first layer of the second coupling section 16A and the first layer of the second coupling section 16B are arranged to be adjacent in the track width direction (the X direction).

The write head unit further includes a waveguide including a core 20 and a cladding, the core 20 allowing light to propagate therethrough, the cladding being provided around the core 20. As shown in FIGS. 6 to 8 in particular, the core 20 has a front end face 20a facing toward the medium facing surface 80, an evanescent light generating surface 20b which is a top surface, a bottom surface 20c, and two side surfaces.

In the present embodiment, as shown in FIGS. 6 to 8, the front end face 20a of the core 20 includes a first portion 20a1 located at a distance from the medium facing surface 80 and a second portion 20a2 located in the medium facing surface 80. The second portion 20a2 is located on the rear side in the direction of travel of the recording medium 90 relative to the first portion 20a1. There is a difference in level between the first portion 20a1 and the second portion 20a2. A portion of the shield 17 is located between the first portion 20a1 and the medium facing surface 80. Alternatively, the entire front end face 20a may be located at a distance from the medium facing surface 80. The shape and location of the shield 17 and the shape of the front end face 20a of the core 20 will be described in more detail later.

The cladding includes cladding layers 19, 21 and 22. The cladding layer 19 lies on the coupling layers 12 and 13 and the insulating layer 14. The core 20 lies on the cladding layer 19. The cladding layer 21 lies on the cladding layer 19 and surrounds the shield 17 and the core 20. The cladding layer 22 is disposed over the evanescent light generating surface 20b of the core 20 and the top surface of the cladding layer 21.

The core 20 is formed of a dielectric material that transmits laser light to be used for generating near-field light. The laser light emitted from a non-illustrated laser diode enters the core 20 and propagates through the core 20. The cladding layers 19, 21 and 22 are each formed of a dielectric material that has a refractive index lower than that of the core 20. For example, the core 20 may be formed of tantalum oxide such as $Ta_2O_5$ or silicon oxynitride (SiON), whereas the cladding layers 19, 21 and 22 may be formed of silicon oxide ($SiO_2$) or alumina.

The first coupling sections 15A and 15B and the first layers of the second coupling sections 16A and 16B are embedded in the cladding layers 19 and 21. The first coupling section 15A and the first coupling section 15B are located on opposite sides of the core 20 in the track width direction (the X direction) and spaced from the core 20. The first layer of the second coupling section 16A and the first layer of the second coupling section 16B are also located on opposite sides of the core 20 in the track width direction (the X direction) and spaced from the core 20, but located farther from the medium facing surface 80 than are the first coupling sections 15A and 15B.

The write head unit further includes a plasmon generator 50 according to the present embodiment. The plasmon generator 50 lies on the cladding layer 22 in the vicinity of the medium facing surface 80. The plasmon generator 50 is configured to excite surface plasmons on the principle to be described later. The plasmon generator 50 is formed of, for example, one of Au, Ag, Al, Cu, Pd, Pt, Rh and Ir, or an alloy composed of two or more of these elements. The shape of the plasmon generator 50 will be described in detail later.

The write head unit further includes: dielectric layers 23 and 24 stacked in this order on the cladding layer 22 and surrounding the plasmon generator 50; a dielectric layer 25 located near the medium facing surface 80 and lying on a portion of the plasmon generator 50 and a portion of the dielectric layer 24; a dielectric layer 26 located away from the medium facing surface 80 and lying on another portion of the dielectric layer 24; and a heat sink 27 lying on another portion of the plasmon generator 50 and on the dielectric layer 26. The heat sink 27 has the function of dissipating heat generated at the plasmon generator 50 outward from the plasmon generator 50. The heat sink 27 is formed of Au or Cu, for example. The dielectric layers 23 to 26 are formed of the same material as the cladding layers 19, 21 and 22, for example.

The write head unit further includes a dielectric layer 28 disposed around the heat sink 27, and a nonmagnetic metal film 29 lying on the dielectric layer 25 and the heat sink 27. The main pole 30 lies on the nonmagnetic metal film 29. The plasmon generator 50 lies between the core 20 and the main pole 30. The nonmagnetic metal film 29 has the function of preventing the material of the heat sink 27 from diffusing into the main pole 30, and thereby preventing deterioration of the magnetic properties of the main pole 30. The nonmagnetic metal film 29 is formed of Ru, Ta or Ti, for example. FIGS. 8 and 9 omit the illustration of the nonmagnetic metal film 29. The dielectric layer 28 is formed of the same material as the cladding layers 19, 21 and 22, for example.

The main pole 30 may include a narrow portion 30A and a wide portion 20B as shown in FIG. 10, the narrow portion 30A having the end face 30a and an end opposite thereto, the wide portion 30B being connected to the end of the narrow portion 30A. The wide portion 30B is greater than the narrow portion 30A in width in the track width direction (the X direction). The width of the narrow portion 30A in the track width direction is substantially constant regardless of distance from the medium facing surface 80. The width of the wide portion 30B in the track width direction increases with increasing distance from the medium facing surface 80.

The write head unit further includes a heat sink 32 lying on the nonmagnetic metal film 29 and surrounding the main pole 30, and a nonmagnetic metal film 31 interposed between the main pole 30 and the heat sink 32. The heat sink 32 has the function of dissipating heat transferred from the plasmon generator 50 to the main pole 30 outward from the main pole 30. The heat sink 32 is formed of the same material as the heat sink 27, for example. The nonmagnetic metal film 31 has the function of preventing the material of the heat sink 32 from diffusing into the main pole 30, and thereby preventing deterioration of the magnetic properties of the main pole 30. The nonmagnetic metal film 31 is formed of the same material as the nonmagnetic metal film 29, for example. FIGS. 8 and 9 omit the illustration of the nonmagnetic metal film 31.

The second layers of the second coupling sections 16A and 16B are embedded in the cladding layer 22 and the dielectric layers 23, 24, 26 and 28. The coupling layer 33 lies on the second layers of the second coupling sections 16A and 16B and the dielectric layer 28.

The coil 34 includes a first layer 34A and a second layer 34B. As shown in FIG. 10, the first layer 34A is wound around the coupling layer 33. The write head unit further includes: an insulating film 35 for separating the first layer 34A from the dielectric layer 28, the heat sink 32 and the coupling layer 33; an insulating layer 36 disposed around the heat sink 32 and the first layer 34A and in the space between adjacent turns of the first layer 34A; and an insulating layer 37 lying on the heat sink 32, the first layer 34A, the insulating film 35 and the insulating layer 36. The insulating film 35 and the insulating layers 36 and 37 are formed of alumina, for example.

The first yoke portion 38 includes a first layer 38A and a second layer 38B. A portion of the first layer 38A lies on the main pole 30, while another portion of the first layer 38A lies on the insulating layer 37. The first layer 38A has an end face facing toward the medium facing surface 80. This end face of the first layer 38A is located at a distance from the medium facing surface 80. The coupling layer 39 lies on the coupling layer 33.

The second layer 34B of the coil 34 lies above the first layer 34A. As shown in FIG. 11, the second layer 34B is wound around the coupling layer 39. The write head unit further includes: an insulating film 40 for separating the second layer 34B from the insulating layer 37, the first layer 38A of the first yoke portion 38 and the coupling layer 39; an insulating layer 41 disposed around the second layer 34B and the first layer 38A and in the space between adjacent turns of the second layer 34B; and an insulating layer 42 lying on the second layer 34B, the insulating film 40 and the insulating layer 41. The insulating film 40 and the insulating layers 41 and 42 are formed of alumina, for example.

The second layer 38B of the first yoke portion 38 lies on the first layer 38A, the coupling layer 39 and the insulating layer 42. The second layer 38B has an end face facing toward the medium facing surface 80. This end face of the second layer 38B is located at a distance from the medium facing surface 80. The write head unit further includes an insulating layer 43 disposed around the second layer 38B. The insulating layer 43 is formed of alumina, for example.

The thermally-assisted magnetic recording head further includes a protective layer 44 disposed to cover the write head unit. The protective layer 44 is formed of alumina, for example.

As has been described, the thermally-assisted magnetic recording head according to the present embodiment includes the medium facing surface 80, the read head unit, and the write head unit. The read head unit and the write head unit are stacked on the substrate 1. The write head unit is located on the trailing side, i.e., the front side in the direction of travel of the recording medium 90 (the Z direction), relative to the read head unit.

The write head unit includes the coil 34, the main pole 30, the waveguide, the plasmon generator 50, the shield 17, and the return path section R. The waveguide includes the core 20 and the cladding. The cladding includes the cladding layers 19, 21 and 22. The return path section R includes the return pole layer 11, the coupling layers 12, 13, 33 and 39, the two first coupling sections 15A and 15B, the two second coupling sections 16A and 16B, and the first yoke portion 38.

The main pole 30 has the end face 30a located in the medium facing surface 80. The shield 17 has the end face 17a located in the medium facing surface 80. The end face 30a of the main pole 30 and the end face 17a of the shield 17 are at locations different from each other in the direction of travel of the recording medium 90 (the Z direction). In the present embodiment, in particular, the end face 17a of the shield 17 is located on the leading side, i.e., the rear side in the direction of travel of the recording medium 90, relative to the end face 30a of the main pole 30.

The main pole 30 is located on the front side in the direction of travel of the recording medium 90 relative to the core 20. The core 20 has the front end face 20a facing toward the medium facing surface 80. The front end face 20a includes the first portion 20a1 and the second portion 20a2. A portion of the shield 17 is located between the first portion 20a1 of the front end face 20a of the core 20 and the medium facing surface 80. The end face 17a of the shield 17 is located between the end face 30a of the main pole 30 and the second portion 20a2 of the front end face 20a of the core 20 in the direction of travel of the recording medium 90.

The shield 17 captures a disturbance magnetic field applied to the thermally-assisted magnetic recording head from the outside thereof. This makes it possible to prevent the disturbance magnetic field from being intensively captured into the main pole 30 and thereby causing erroneous writing on the recording medium 90. The shield 17 also has the function of capturing a magnetic flux that is produced from the end face 30a of the main pole 30 and spreads in directions other than the direction perpendicular to the plane of the recording medium 90, and thereby preventing the magnetic flux from reaching the recording medium 90. This makes it possible to increase the gradient of a change in the write magnetic field strength with respect to a positional change along the direction in which the tracks extend, which will hereinafter be called the gradient of the write magnetic field strength. The shield 17 and the return path section R also have the function of allowing a magnetic flux that has been produced from the end face 30a of the main pole 30 and has magnetized a portion of the recording medium 90 to flow back to the main pole 30.

The shape and location of the coil 34 will now be described in detail with reference to FIGS. 10 and 11. As shown in FIG. 10, the first layer 34A of the coil 34 is wound approximately three times around the coupling layer 33. The first layer 34A includes a portion extending to pass through between the main pole 30 and the coupling layer 33. The first layer 34A has a coil connection 34E electrically connected to the second layer 34B of the coil 34.

As shown in FIG. 11, the second layer 34B of the coil 34 is wound approximately three times around the coupling layer 39. The second layer 34B includes a portion extending to pass through between the first layer 38A of the first yoke portion 38 and the coupling layer 39. The second layer 34B has a coil connection 34S electrically connected to the coil connection 34E of the first layer 34A. The coil connection 34S penetrates the insulating layer 37 and the insulating film 40 (see FIG. 8) and is electrically connected to the coil connection 34E. In the example shown in FIGS. 10 and 11, the first layer 34A and the second layer 34B are connected in series.

Figure 1:
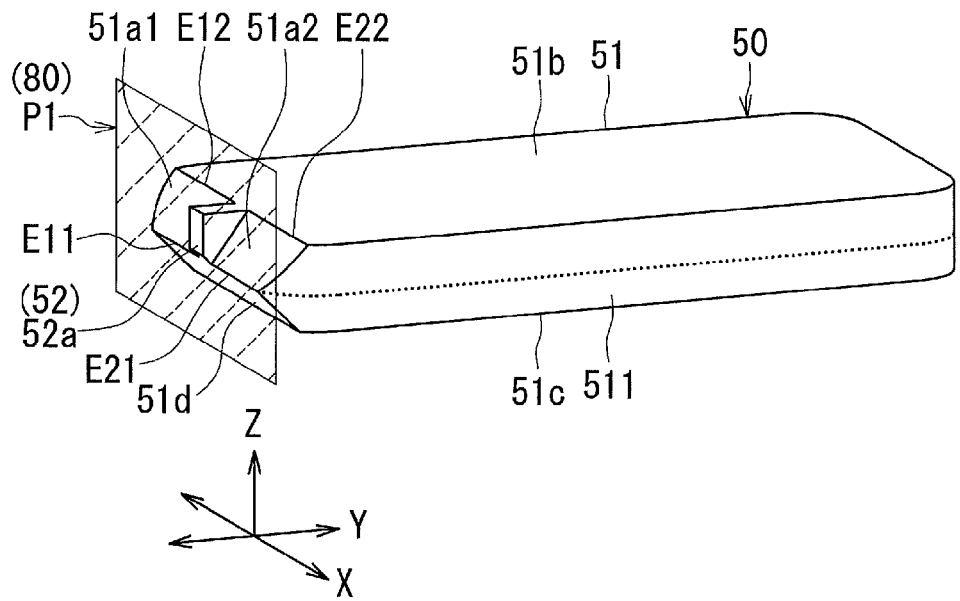
FIG. 1 is a perspective view showing a plasmon generator according to a first embodiment of the invention.
Figure 2:
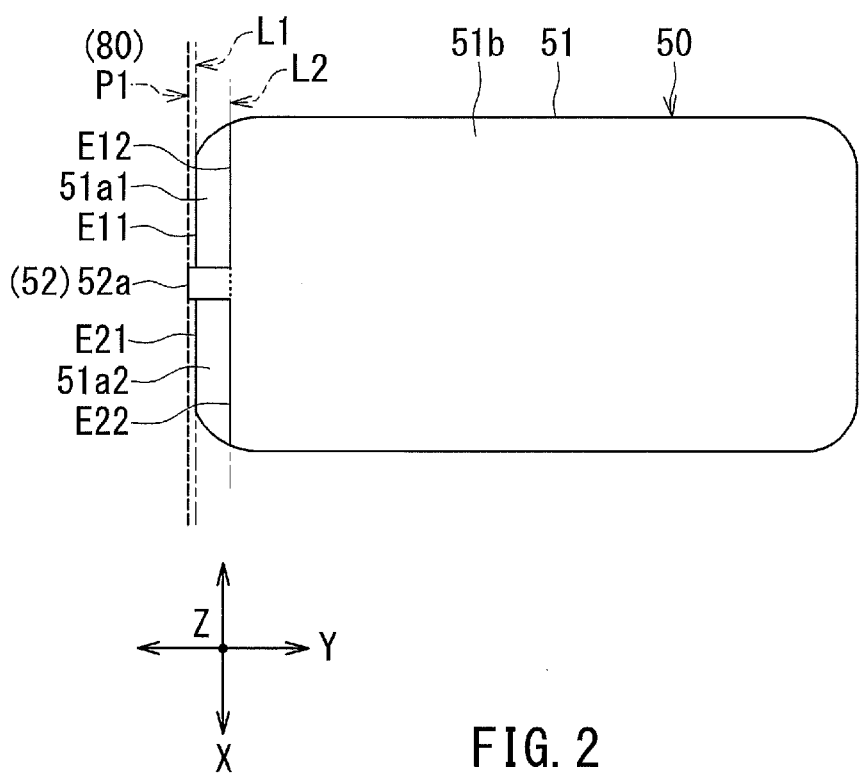
FIG. 2 is a plan view showing the plasmon generator according to the first embodiment of the invention.
Figure 3:
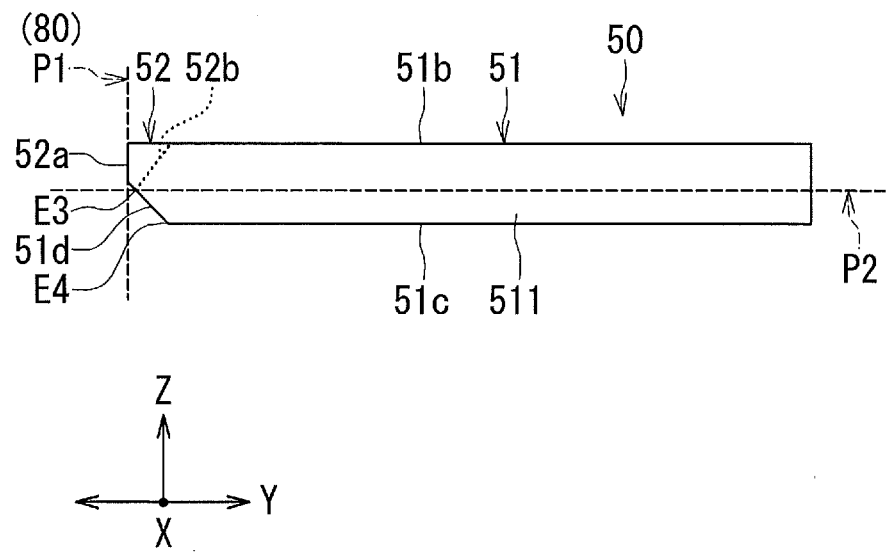
FIG. 3 is a cross-sectional view showing the plasmon generator according to the first embodiment of the invention.

The plasmon generator 50 according to the present embodiment will now be described in detail with reference to FIGS. 1 to 3. FIG. 1 is a perspective view showing the plasmon generator 50. FIG. 2 is a plan view showing the plasmon generator 50. FIG. 3 is a cross-sectional view showing the plasmon generator 50. FIGS. 1 to 3 also show the X, Y and Z directions mentioned previously.

As shown in FIGS. 1 to 3, the plasmon generator 50 includes a main body 51, and a front protrusion 52 protruding from the main body 51. In each of FIGS. 2 and 3, the boundary between the main body 51 and the front protrusion 52 is indicated by a dotted line. As shown in FIG. 3, the front protrusion 52 has a proximal portion 52$b$ which is the boundary with the main body 51, and a near-field light generating surface 52$a$ which is a protruding end. FIG. 3 shows a cross section that intersects the near-field light generating surface 52$a$ and that is perpendicular to the medium facing surface 80 and to the top surface 1$a$ (see FIGS. 8 and 9) of the substrate 1. The near-field light generating surface 52$a$ is located in the medium facing surface 80. The near-field light generating surface 52$a$ generates near-field light on the principle to be described later.

As shown in FIGS. 1 to 3, assume a first imaginary plane P1 including the near-field light generating surface 52$a$. The first imaginary plane P1 is also the XZ plane including the near-field light generating surface 52$a$. The medium facing surface 80 is included in the first imaginary plane P1.

The main body 51 has a first inclined surface 51$a$1 and a second inclined surface 51$a$2 each facing toward the first imaginary plane P1 (the medium facing surface 80). As shown in FIGS. 1 and 2, the first inclined surface 51$a$1 and the second inclined surface 51$a$2 are at a distance from each other and aligned in the X direction (the track width direction) parallel to the first imaginary plane P1 (the medium facing surface 80). The X direction corresponds to the first direction of the present invention.

Each of the first inclined surface 51$a$1 and the second inclined surface 51$a$2 has a first edge located at a smallest distance from the first imaginary plane P1 (the medium facing surface 80), and a second edge located at a largest distance from the first imaginary plane P1. Hereinafter, the first edge and the second edge of the first inclined surface 51$a$1 will be denoted by symbols E11 and E12, respectively, and the first edge and the second edge of the second inclined surface 51$a$2 will be denoted by symbols E21 and E22, respectively. As shown in FIG. 2, the first edge E1$l$ of the first inclined surface 51$a$1 and the first edge E21 of the second inclined surface 51$a$2 are located on a first imaginary straight line L1 extending in the X direction (the first direction). In the present embodiment, the first imaginary straight line L1 is located at a distance from the first imaginary plane P1. The second edge E12 of the first inclined surface 51$a$1 and the second edge E22 of the second inclined surface 51$a$2 are located on a second imaginary straight line L2 extending in the X direction (the first direction).

As shown in FIG. 3, assume a second imaginary plane P2 including the first imaginary straight line L1 shown in FIG. 2 and perpendicular to the first imaginary plane P1. The second imaginary plane P2 is also the XY plane including the first imaginary straight line L1, and is parallel to the top surface 1$a$ of the substrate 1 shown in FIGS. 8 and 9. Each of the first inclined surface 51$a$1 and the second inclined surface 51$a$2 is inclined with respect to both of the first imaginary plane P1 (the medium facing surface 80) and the second imaginary plane P2.

In the example shown in FIG. 1 and in FIG. 4 to be described later, each of the first inclined surface 51$a$1 and the second inclined surface 51$a$2 is a single plane. In this case, each of the first inclined surface 51$a$1 and the second inclined surface 51$a$2 preferably forms an angle θ in the range of 30° to 70°, more preferably in the range of 40° to 60°, with respect to the second imaginary plane P2.

As will be shown later as a plurality of modification examples, each of the first inclined surface 51$a$1 and the second inclined surface 51$a$2 may include a plurality of planar portions that form different angles with respect to the second imaginary plane P2. Alternatively, at least part of each of the first inclined surface 51$a$1 and the second inclined surface 51$a$2 may be curved.

Now, we define extended inclination angle as follows. Extended inclination angle is an angle that a straight line connecting two points on each of the first and second inclined surfaces 51$a$1 and 51$a$2 forms with respect to the second imaginary plane P2, the two points being located in a third imaginary plane perpendicular to the first imaginary plane P1 and the second imaginary plane P2. The extended inclination angle is a concept indicative of characteristics relating to the inclination of each of the first inclined surface 51$a$1 and the second inclined surface 51$a$2 regardless of whether each of the first inclined surface 51$a$1 and the second inclined surface 51$a$2 is a single plane.

Now, the extended inclination angle will be described specifically with reference to FIG. 4 by taking the first inclined surface 51$a$1 as an example. FIG. 4 is a cross-sectional view showing a cross section of the plasmon generator 50 cut by the third imaginary plane. The third imaginary plane is also the YZ plane intersecting the first inclined surface 51$a$1 or the second inclined surface 51$a$2, and is perpendicular to the medium facing surface 80 and to the top surface 1$a$ of the substrate 1. The third imaginary plane in the example shown in FIG. 4 intersects the first inclined surface 51$a$1.

Figure 4:
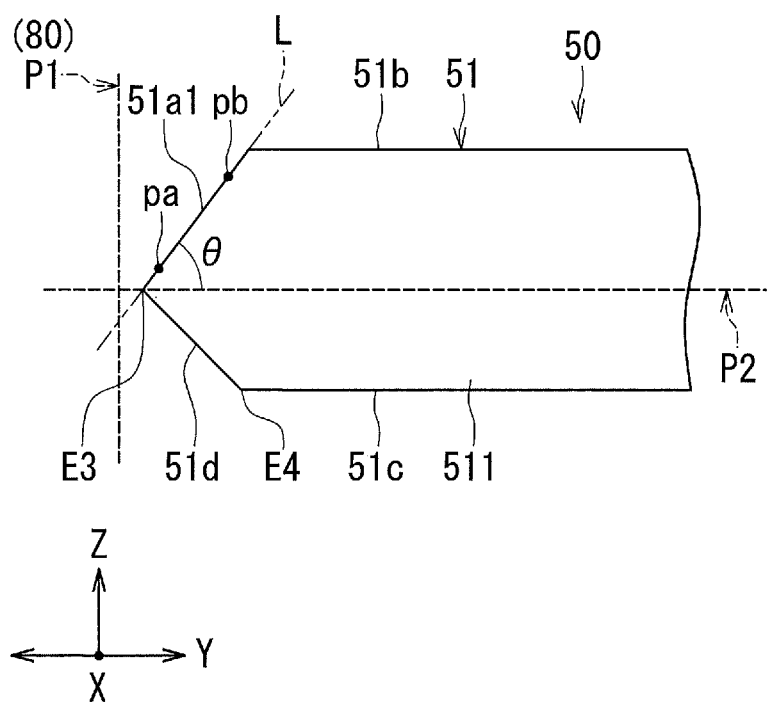
FIG. 4 is a cross-sectional view showing a cross section of the plasmon generator cut by a third imaginary plane.

In FIG. 4, the symbols pa and pb represent two points on the first inclined surface 51$a$1, the two points being located in the third imaginary plane. The angle that the straight line L connecting the two points pa and pb forms with respect to the second imaginary plane P2 is the extended inclination angle of the first inclined surface 51$a$1. If the first inclined surface 51$a$1 is a single plane, the extended inclination angle of the first inclined surface 51$a$1 is always equal to the angle θ shown in FIG. 4 no matter how the locations of the two points pa and pb are chosen.

If the first inclined surface 51$a$1 is not a single plane, the extended inclination angle can vary depending on the locations of the two points pa and pb. For example, suppose the first inclined surface 51$a$1 is a curved surface and the line resulting from the intersection of the first inclined surface 51$a$1 and the third imaginary plane is a curved line. In such a case, if the locations of the two points pa and pb on the curved line are brought into the utmost proximity to each other, the straight line L becomes one that comes into contact with the curved line at the midpoint between the two points pa and pb. In this case, the extended inclination angle, i.e., the angle that the straight line L forms with respect to the second imaginary plane P2, varies depending on the locations of the two points pa and pb.

The extended inclination angle of the second inclined surface 51a2 is defined similarly to that of the first inclined surface 51a1.

In the present embodiment, the extended inclination angle preferably falls within the range of 30° to 70°, more preferably within the range of 40° to 60°, no matter what shape the first and second inclined surfaces 51a1 and 51a2 have, and no matter how the locations of the two points pa and pb are chosen.

As shown in FIGS. 1 and 3, the main body 51 further has a top surface 51b and a plasmon exciting section 51c. The top surface 51b is contiguous with the first and second inclined surfaces 51a1 and 51a2, and includes the second edges E12 and E22 of the first and second inclined surfaces 51a1 and 51a2. The plasmon exciting section 51c is located opposite to the top surface 51b. The plasmon exciting section 51c is configured to excite surface plasmons thereon. Most part of the top surface 51b is constant in width in the track with direction (the X direction) regardless of distance from the first imaginary plane P1 (the medium facing surface 80). The plasmon exciting section 51c faces the evanescent light generating surface 20b of the core 20 shown in FIGS. 6 and 8 with a predetermined spacing therefrom.

As shown in FIGS. 1 and 3, the main body 51 includes a lower protrusion 511 located on a side of the second imaginary plane P2 opposite from the top surface 51b. In FIG. 1, the boundary between the lower protrusion 511 and the remaining portion of the main body 51 is indicated by a dotted line. The lower protrusion 511 includes the plasmon exciting section 51c, and has a front end face 51d facing toward the first imaginary plane P1 (the medium facing surface 80) and not included in the first imaginary plane P1. A portion of the dielectric layer 23 shown in FIGS. 6 to 9 is interposed between the front end face 51d and the medium facing surface 80.

In the present embodiment, as shown in FIGS. 3 and 4, the front end face 51d of the lower protrusion 511 is inclined with respect to both of the first imaginary plane P1 and the second imaginary plane P2. The front end face 51d has a third edge E3 located at a smallest distance from each of the first imaginary plane P1 and the second imaginary plane P2, and a fourth edge E4 located at a largest distance from each of the first imaginary plane P1 and the second imaginary plane P2.

The shape and location of the shield 17 and the shape of the front end face 20a of the core 20 will now be described in detail with reference to FIGS. 5 to 7. The shield 17 has the end face 17a located in the medium facing surface 80, and further has a rear end face 17b, a top surface 17c and a bottom surface 17d, the rear end face 17b being located opposite to the end face 17a. The shield 17 is shaped to be greater in dimension in the track width direction (the X direction) than in dimension in the direction perpendicular to the top surface 1a of the substrate 1 (the Z direction).

The end face 30a of the main pole 30 and the end face 17a of the shield 17 are at locations different from each other in the direction of travel of the recording medium 90. In the present embodiment, the end face 17a of the shield 17 is located on the rear side in the direction of travel of the recording medium 90 relative to the end face 30a of the main pole 30. The near-field light generating surface 52a of the front protrusion 52 of the plasmon generator 50 is located between the end face 30a of the main pole 30 and the end face 17a of the shield 17. As shown in FIG. 7, the distance between the end face 30a of the main pole 30 and the end face 17a of the shield 17 is denoted by reference letter D. The distance D is preferably in the range of 50 to 300 nm, and more preferably in the range of 50 to 100 nm.

The front end face 20a of the core 20 includes the first portion 20a1 and the second portion 20a2, as mentioned previously. As shown in FIG. 7, the front end face 20a has a first edge E1 and a second edge E2 located opposite to each other in the direction of travel of the recording medium 90 (the Z direction). The first edge E1 is located closer to the near-field light generating surface 52a than is the second edge E2. The first edge E1 also serves as the front-side end of the first portion 20a1 in the direction of travel of the recording medium 90. The second edge E2 also serves as the rear-side end of the second portion 20a2 in the direction of travel of the recording medium 90.

In FIG. 7, the dotted line indicates the midpoint position between the first edge E1 and the second edge E2. This midpoint position will be denoted by reference letter C. Further, the front end face 20a is divided into two regions: a first region R1 extending from the midpoint position C to the first edge E1; and a second region R2 extending from the midpoint position C to the second edge E2. The first region R1 includes the first portion 20a1 and a part of the second portion 20a2. The second region R2 includes the remainder of the second portion 20a2.

The shield 17 overlaps only the first region R1 of the front end face 20a of the core 20 when viewed in the direction perpendicular to the medium facing surface 80 (the Y direction). The shield 17 particularly overlaps only the first portion 20a1 of the first region R1. A portion of the rear end face 17b of the shield 17 is opposed to the first portion 20a1. The portion of the rear end face 17b may or may not be in contact with the first portion 20a1. In the latter case, a portion of the cladding may be interposed between the portion of the rear end face 17b and the first portion 20a1.

The shield 17 includes an overlapping portion 17A which overlaps the first region R1 (the first portion 20a1) when viewed in the direction perpendicular to the medium facing surface 80, and further includes a first non-overlapping portion 17B and a second non-overlapping portion 17C located on opposite sides of the overlapping portion 17A in the track width direction (the X direction). In FIG. 5, the boundaries between the overlapping portion 17A and the first and second non-overlapping portions 17B and 17C are indicated by dotted lines. The length of the overlapping portion 17A in the direction perpendicular to the medium facing surface 80 is constant regardless of position along the track width direction.

The first and second non-overlapping portions 17B and 17C are located on opposite sides of the front end face 20a of the core 20 in the track width direction when viewed in the direction perpendicular to the medium facing surface 80. Thus, the first and second non-overlapping portions 17B and 17C do not overlap the front end face 20a. The maximum length of each of the first and second non-overlapping portions 17B and 17C in the direction perpendicular to the medium facing surface 80 is greater than the length of the overlapping portion 17A in that direction. The top surface of the first coupling section 15A is in contact with a portion of the bottom surface 17d of the shield 17 that is included in the first non-overlapping portion 17B. The top surface of the first coupling section 15B is in contact with a portion of the bottom surface 17d of the shield 17 that is included in the second non-overlapping portion 17C.

The top surface 17c of the shield 17 and the evanescent light generating surface 20b of the core 20 are coplanar.

Alternatively, the top surface 17c and the evanescent light generating surface 20b may be at different locations in the direction of travel of the recording medium 90 (the Z direction). The plasmon exciting section 51c of the main body 51 of the plasmon generator 50 faces the top surface 17c and the evanescent light generating surface 20b with a predetermined spacing from each of the top surface 17c and the evanescent light generating surface 20b. A portion of the cladding layer 22 is interposed between the plasmon exciting section 51c and each of the top surface 17c and the evanescent light generating surface 20b.

Now, the principle of generation of near-field light in the present embodiment and the principle of thermally-assisted magnetic recording using near-field light will be described in detail. Laser light emitted from a laser diode (not illustrated) enters the core 20. As shown in FIG. 8, the laser light 60 propagates through the core 20 toward the medium facing surface 80, and reaches the vicinity of the plasmon generator 50. The evanescent light generating surface 20b of the core 20 generates evanescent light based on the laser light 60 propagating through the core 20. More specifically, the laser light 60 is totally reflected at the evanescent light generating surface 20b, and the evanescent light generating surface 20b thereby generates evanescent light that permeates into the cladding layer 22. In the plasmon generator 50, surface plasmons are excited on the plasmon exciting section 51c of the main body 51 through coupling with the aforementioned evanescent light. The surface plasmons propagate to the near-field light generating surface 52a of the front protrusion 52, and near-field light is generated by the near-field light generating surface 52a of the front protrusion 52 based on the surface plasmons.

The near-field light generated by the near-field light generating surface 52a is projected toward the recording medium 90, reaches the surface of the recording medium 90 and heats a portion of the magnetic recording layer of the recording medium 90. This lowers the coercivity of the portion of the magnetic recording layer. In thermally-assisted magnetic recording, the portion of the magnetic recording layer with the lowered coercivity is subjected to a write magnetic field produced by the main pole 30 for data writing.

A method of manufacturing the thermally-assisted magnetic recording head according to the present embodiment will now be described. The method of manufacturing the thermally-assisted magnetic recording head includes the steps of forming components of a plurality of thermally-assisted magnetic recording heads, except the substrates 1, on a wafer that includes portions to become the substrates 1 of the plurality of thermally-assisted magnetic recording heads, thereby fabricating a substructure including a plurality of pre-head portions arranged in rows, the plurality of pre-head portions becoming individual thermally-assisted magnetic recording heads later; and cutting the substructure to separate the plurality of pre-head portions from each other and forming the medium facing surface 80 for each of the plurality of pre-head portions (this step will be referred to as the step of forming the medium facing surface 80). A plurality of thermally-assisted magnetic recording heads are produced in this manner.

The method of manufacturing the thermally-assisted magnetic recording head according to the present embodiment will be described in more detail below with attention focused on a single thermally-assisted magnetic recording head. The method of manufacturing the thermally-assisted magnetic recording head starts with forming the insulating layer 2, the bottom shield layer 3, and the bottom shield gap film 4 in this order on the substrate 1. Then, the MR element 5 and two leads (not illustrated) connected to the MR element 5 are formed on the bottom shield gap film 4. The top shield gap film 6 is then formed to cover the MR element 5 and the leads. Next, the top shield layer 7, the insulating layer 8, the middle shield layer 9, and the nonmagnetic layer 10 are formed in this order on the top shield gap film 6.

The return pole layer 11 is then formed on the nonmagnetic layer 10. Next, a non-illustrated insulating layer is formed to cover the return pole layer 11. The non-illustrated insulating layer is then polished by, for example, chemical mechanical polishing (hereinafter referred to as CMP), until the return pole layer 11 is exposed. Next, the coupling layers 12 and 13 are formed on the return pole layer 11. Then, the insulating layer 14 is formed over the entire top surface of the stack. The insulating layer 14 is then polished by, for example, CMP, until the coupling layers 12 and 13 are exposed.

Next, the cladding layer 19 is formed over the entire top surface of the stack. The cladding layer 19 is then selectively etched to form therein two first openings for exposing the top surface of the coupling layer 12 and two second openings for exposing the top surface of the coupling layer 13. Next, the first coupling sections 15A and 15B are formed on the coupling layer 12 at the locations of the first openings, and the first layers of the second coupling sections 16A and 16B are formed on the coupling layer 13 at the locations of the second openings. Then, the core 20 is formed on the cladding layer 19. The cladding layer 21 is then formed over the entire top surface of the stack. The cladding layer 21 is then polished by, for example, CMP, until the core 20 and the first layers of the second coupling sections 16A and 16B are exposed. Then, the core 20 and the cladding layer 21 are etched to form therein a receiving section for receiving the shield 17. The shield 17 is then formed in the receiving section.

Reference is now made to FIGS. 12A to 20B to describe steps to be performed after the formation of the shield 17 up to the step of providing an initial plasmon generator with the first and second inclined surfaces 51a1 and 51a2. The initial plasmon generator is to become the plasmon generator 50 later. FIGS. 12A to 20B each show a stack of layers formed in the process of manufacturing the thermally-assisted magnetic recording head. The first imaginary plane P1 shown in some of these figures indicates the location at which the medium facing surface 80 is to be formed.

Now, let n represent an integer 12, 13, 14, 15, 16, 19 or 20. FIG. nA shows a cross section that intersects the end face 30a of the main pole 30 and that is perpendicular to the medium facing surface 80 and to the top surface 1a of the substrate 1. FIG. nB shows a cross section of the stack taken at the location at which the medium facing surface 80 is to be formed. These figures omit the illustration of portions that are closer to the substrate 1 relative to the core 20 and the cladding layer 21. For ease of understanding, the shield 17, the core 20 and the cladding layer 21 in these figures are depicted smaller than they would be in actuality.

Figure 17:
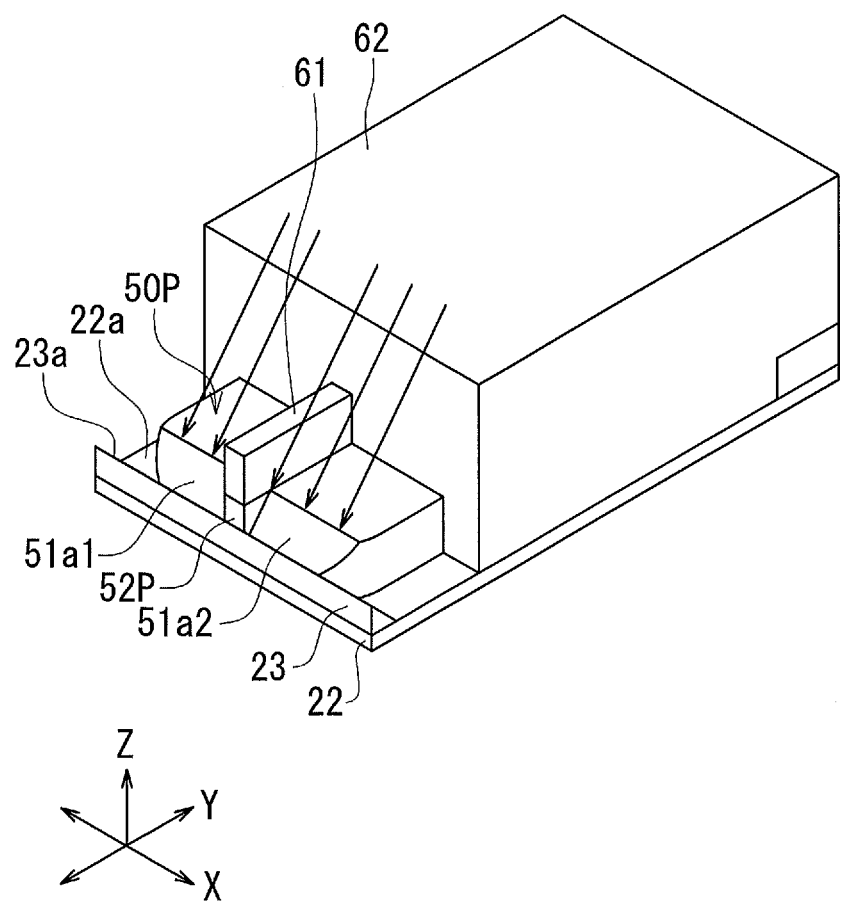
FIG. 17 is a perspective view showing a step that follows the step shown in FIGS. 16A to 16C.
Figure 18A:
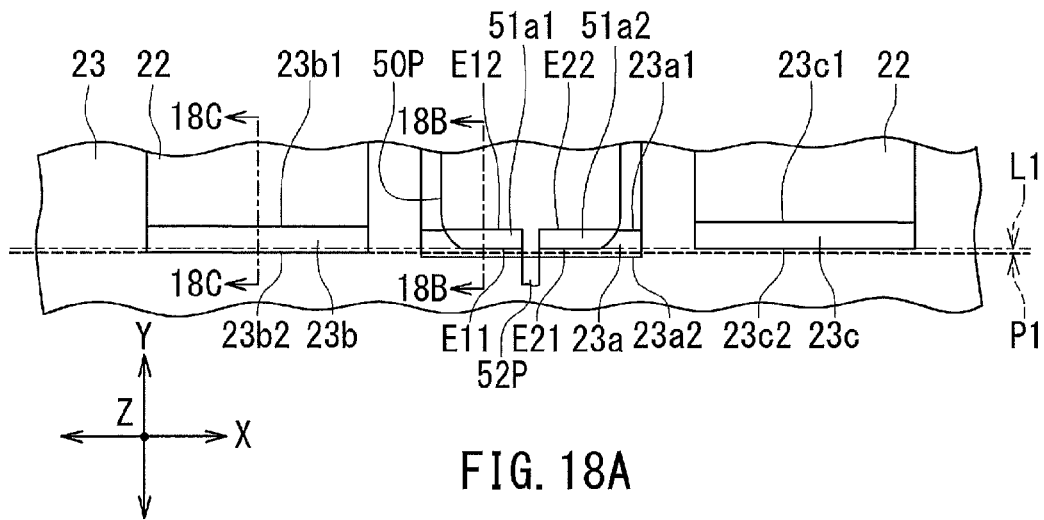
FIGS. 18A to 18C are explanatory diagrams for explaining a method of controlling the location of first edges of first and second inclined surfaces.
Figure 18B:
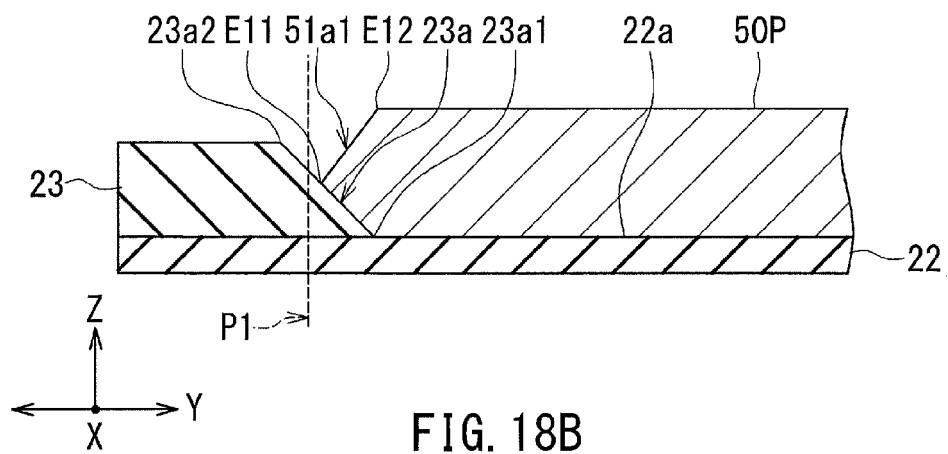
Figure 18C:
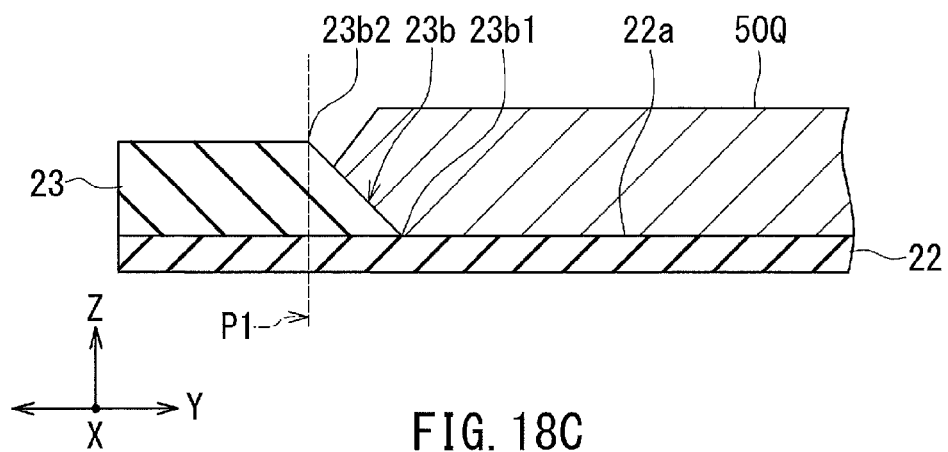

FIG. 17 is a perspective view showing a portion of the stack. FIG. 18A shows the top surface of the portion of the stack. FIG. 18B shows a cross section through the line 18B-18B on FIG. 18A. FIG. 18C shows a cross section through the line 18C-18C on FIG. 18A. FIGS. 18B and 18C omit the illustration of portions that are closer to the substrate 1 relative to the cladding layer 22.

Figure 12A:
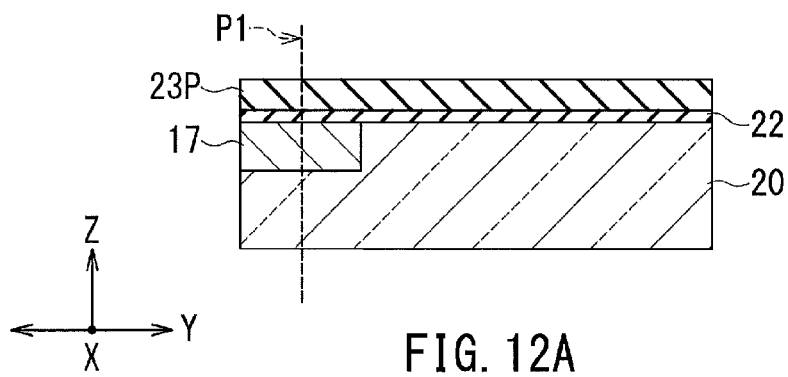
FIGS. 12A and 12B are cross-sectional views showing a step of a method of manufacturing the thermally-assisted magnetic recording head according to the first embodiment of the invention.
Figure 12B:
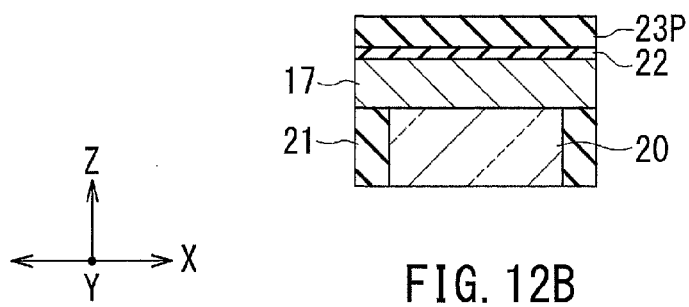
Figure 13A:
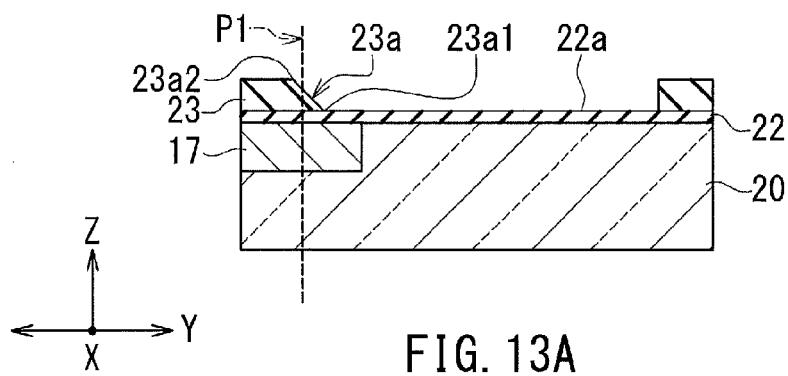
FIGS. 13A and 13B are cross-sectional views showing a step that follows the step shown in FIGS. 12A and 12B.
Figure 13B:
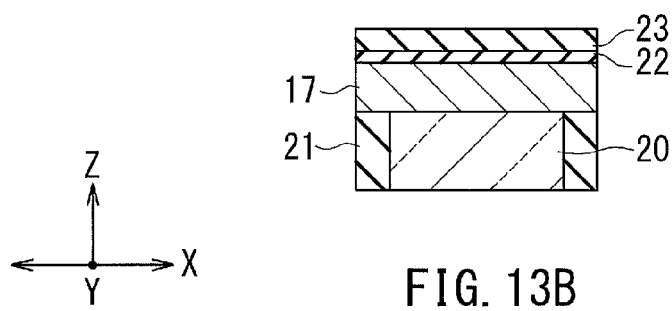

In the manufacturing method for the thermally-assisted magnetic recording head, an underlying section serving as an underlayer for the plasmon generator 50 is formed after the formation of the shield 17. FIGS. 12A to 13B show the step of forming the underlying section. In the step of forming the underlying section, first, the cladding layer 22 is formed over the entire top surface of the stack as shown in FIGS. 12A and 12B. Next, an initial dielectric layer 23P, which will later become the dielectric layer 23, is formed on the cladding layer 22. A photoresist mask (not illustrated) is then formed on the initial dielectric layer 23P. The photoresist mask is formed by patterning a photoresist layer by photolithography. Other photoresist masks to be used in later steps will be formed in the same manner as this photoresist mask. Using the photoresist mask as an etching mask, the initial dielectric layer 23P is then etched by, for example, ion beam etching (hereinafter referred to as IBE) until the cladding layer 22 is exposed, as shown in FIGS. 13A and 13B. This makes the initial dielectric layer 23P into the dielectric layer 23. The photoresist mask is then removed.

The underlying section includes a base portion, and an upward protrusion protruding upward from the base portion. In the present embodiment, the base portion is constituted by the cladding layer 22, and the upward protrusion is constituted by the dielectric layer 23. The base portion has a top surface constituted by the top surface 22a of the cladding layer 22. The upward protrusion (the dielectric layer 23) has a reference surface 23a which defines the location of the front end face 51d of the lower protrusion 511.

In the present embodiment, the reference surface 23a is formed by taper-etching the initial dielectric layer 23P. The reference surface 23a is inclined with respect to a direction perpendicular to the top surface 22a of the cladding layer 22 (the base portion), and intersects the first imaginary plane P1. The reference surface 23a has at least one edge parallel to the first imaginary plane P1. In the present embodiment, the reference surface 23a has a first edge 23a1 and a second edge 23a2 as the aforementioned at least one edge. The first edge. 23a1 is closest to the top surface 22a of the cladding layer 22. The second edge 23a2 is located opposite to the first edge 23a1.

Figure 14A:
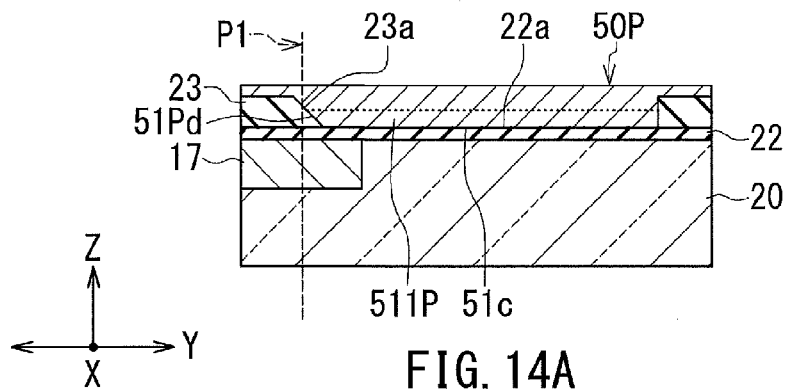
FIGS. 14A and 14B are cross-sectional views showing a step that follows the step shown in FIGS. 13A and 13B.
Figure 14B:
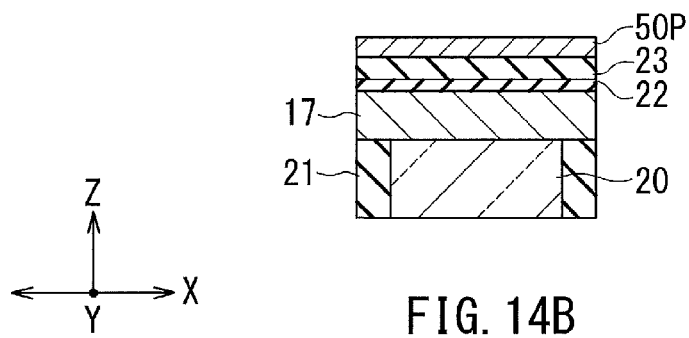

FIGS. 14A and 14B show the next step. This step forms an initial plasmon generator 50P which will later become the plasmon generator 50. More specifically, first, a metal film is formed on the top surface of the stack by sputtering, for example. The metal film is formed such that the top surface of its portion formed along the top surface 22a of the cladding layer 22 is located at a higher level than the top surface of the dielectric layer 23. The metal film may be formed while heating the stack to a temperature of approximately 200° C. This makes it possible to prevent the plasmon generator 50 from being deformed by heat generated by the plasmon generator 50 during use of the thermally-assisted magnetic recording head. Then, the metal film is polished by, for example, CMP, until the level of the top surface 51b of the main body 51 of the plasmon generator 50 is reached, whereby the top surface of the metal film is flattened. This makes the metal film into the initial plasmon generator 50P.

In the present embodiment, the initial plasmon generator 50P is formed to include an initial lower protrusion 511P which will later become the lower protrusion 511. In FIG. 14A, the boundary between the initial lower protrusion 511P and the remaining portion of the initial plasmon generator 50P is indicated by a dotted line. The initial lower protrusion 511P includes the plasmon exciting section 51c, and has an initial front end face 51Pd which will later become the front end face 51d. In the present embodiment, the initial plasmon generator 50P is formed on the underlying section. More specifically, the initial plasmon generator 50P is formed on the cladding layer 22 and the dielectric layer 23 such that the plasmon exciting section 51c contacts the top surface of the base portion, i.e., the top surface 22a of the cladding layer 22, and the initial front end face 51Pd contacts the reference surface 23a of the upward protrusion (the dielectric layer 23).

Figure 15A:
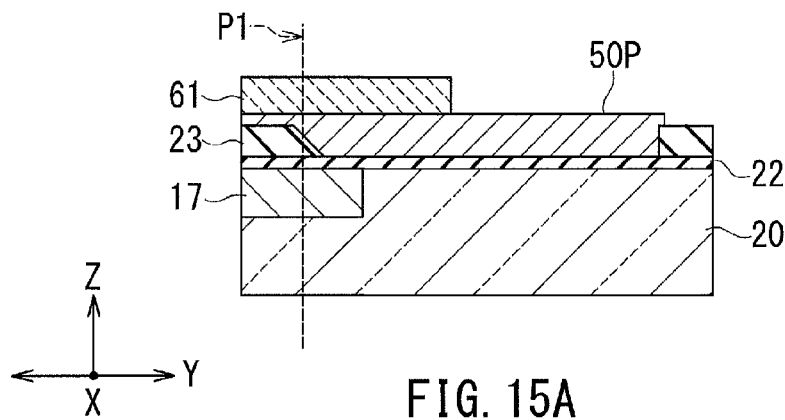
FIGS. 15A and 15B are cross-sectional views showing a step that follows the step shown in FIGS. 14A and 14B.
Figure 15B:
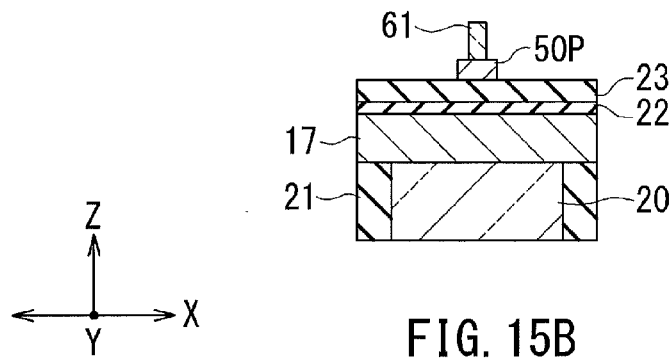

FIGS. 15A and 15B show the next step. In this step, first, a photoresist mask (not illustrated) is formed on the initial plasmon generator 50P. Using the photoresist mask as an etching mask, the initial plasmon generator 50P is then etched by, for example, IBE, and thereby roughly patterned so that the planar shape (the shape as viewed from above) of the initial plasmon generator 50P approximates the planar shape of the plasmon generator 50. The photoresist mask is then removed.

Next, a mask material layer, which will later become a first mask, is formed on the initial plasmon generator 50P. The mask material layer is formed of carbon, for example. Then, an etching mask (not illustrated) is formed on the mask material layer. A hard mask is used as the etching mask. The mask material layer is then etched by, for example, reactive ion etching (hereinafter referred to as RIE), using the etching mask. This makes the mask material layer into the first mask 61. The first mask 61 is for defining the width of the front protrusion 52 in the X direction (the first direction), and is shaped like, for example, a rectangular solid extending in a direction perpendicular to the first imaginary plane P1. In this case, the first mask 61 has two side surfaces opposite to each other in the track width direction and perpendicular to the X direction (the first direction). The first mask 61 is formed to intersect the first imaginary plane P1. Then, the etching mask is removed. Note that the first mask 61 may be formed before the initial plasmon generator 50P is roughly patterned.

Figure 16A:
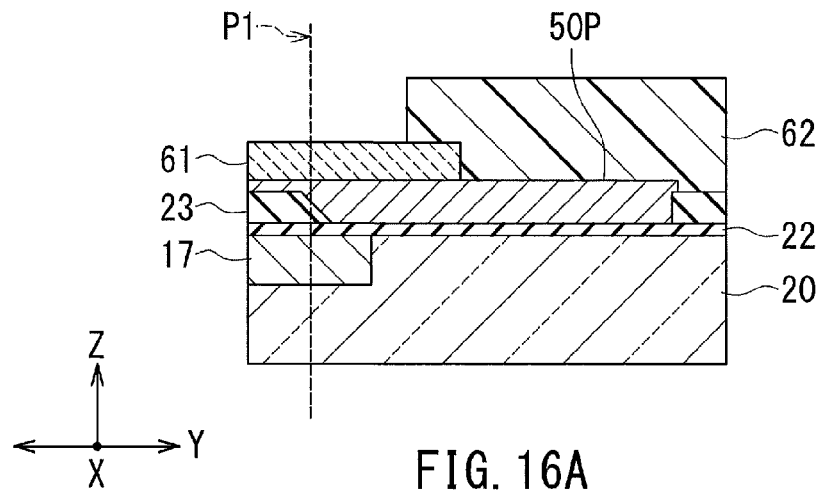
FIGS. 16A to 16C are explanatory diagrams showing a step that follows the step shown in FIGS. 15A and 15B.
Figure 16B:
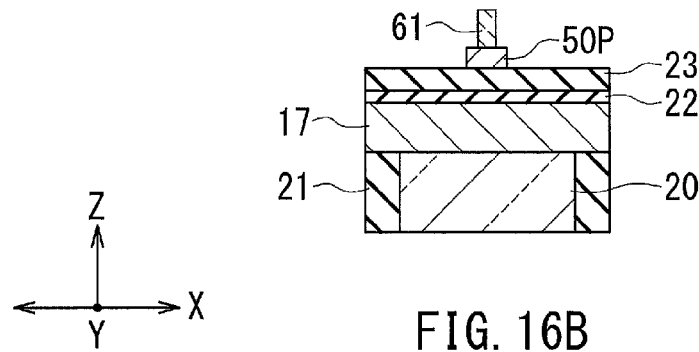
Figure 16C:
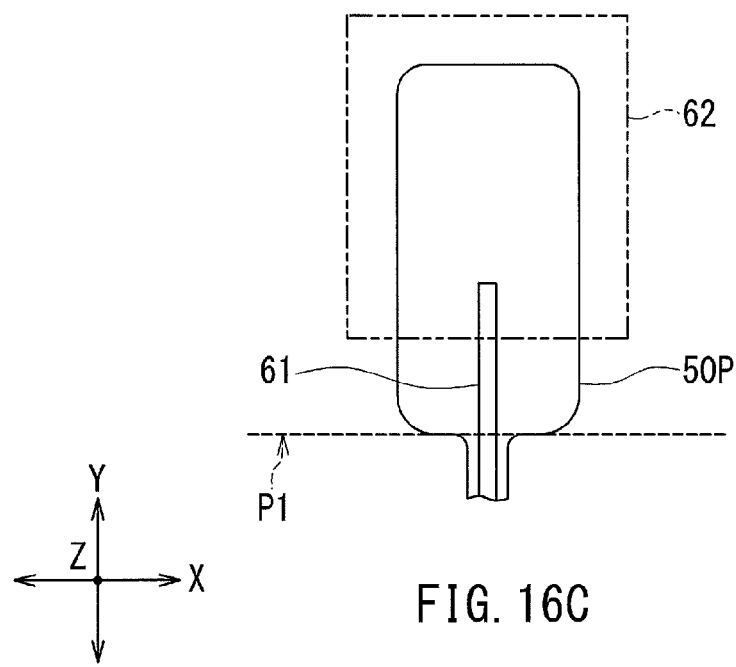

FIGS. 16A to 16C show the next step. In this step, a second mask 62 for defining the location of the first and second inclined surfaces 51a1 and 51a2 is formed on the initial plasmon generator 50P and the first mask 61. A photoresist mask is used as the second mask 62. The second mask 62 does not cover a portion of each of the initial plasmon generator 50P and the first mask 61 near the first imaginary plane P1. The second mask 62 has a front end face facing toward the first imaginary plane P1. The portion of the first mask 61 not covered with the second mask 62 protrudes from the front end face of the second mask 62 and extends in the Y direction. This portion will hereinafter be referred to as the protruding portion of the first mask 61.

FIG. 17 shows the next step. In this step, the initial plasmon generator 50P is etched by IBE using the first and second masks 61 and 62. This etching provides the initial plasmon generator 50P with the first and second inclined surfaces 51a1 and 51a2, and an initial front protrusion 52P which will later become the front protrusion 52. When IBE is performed to etch the initial plasmon generator 50P, the ion beams are allowed to travel in a direction parallel to the two side surfaces of the first mask 61 and at an angle with respect to the direction perpendicular to the top surface 22a of the cladding layer 22 (the base portion). The arrows in FIG. 17 indicate the direction of travel of the ion beams.

Reference is now made to FIGS. 18A to 18C to describe a first method and a second method for controlling either one or both of the location of the first edges E11 and E21 of the first and second inclined surfaces 51a1 and 51a2 and the location of the second edges E12 and E22 of the first and second inclined surfaces 51a1 and 51a2 in the step of etching the initial plasmon generator 50P. FIGS. 18A and 18B omit the illustration of the first and second masks 61 and 62.

The first method uses at least one edge of the reference surface 23a of the upward protrusion (the dielectric layer 23) as a reference in controlling either one or both of the location of the first edges E11 and E21 and the location of the second edges E12 and E22 of the first and second inclined surfaces 51a1 and 51a2.

As a concrete example of the first method, we will describe the case of controlling the location of the first edges E11 and E21 of the first and second inclined surfaces 51a1 and 51a2 by using the second edge 23a2 of the reference surface 23a as a reference. As shown in FIG. 18B, in the step of etching the initial plasmon generator 50P, the etching proceeds and thereby exposes the reference surface 23a which has been covered with the initial plasmon generator 50P. As a result, the second edge 23a2 of the reference surface 23a becomes visible under an electron microscope. The second edge 23a2 is parallel to the first imaginary plane P1 and located at a predetermined distance of zero or more from the first imaginary plane P1. Thus, by identifying the second edge 23a2, it is possible to identify the location of the first imaginary plane P1 and the location where to form the first edges E11 and E21 of the first and second inclined surfaces 51a1 and 51a2. The first method controls the location of the first edges E11 and E21 of the first and second inclined surfaces 51a1 and 51a2 by adjusting, for example, the etching duration or the inclination of the ion beams by using, as a reference, the second edge 23a2 of the reference surface 23a thus identified. It is preferred to use a critical dimension measurement scanning electron microscope as the electron microscope.

The second method forms at least one indicator before the formation of the initial plasmon generator 50P. Then, in the step of etching the initial plasmon generator 50P, either one or both of the location of the first edges E11 and E21 and the location of the second edges E12 and E22 of the first and second inclined surfaces 51a1 and 51a2 are controlled by using the at least one indicator as a reference.

The at least one indicator can be formed by using the upward protrusion (the dielectric layer 23), for example. FIG. 18A shows an example in which the upward protrusion (the dielectric layer 23) has two indicator surfaces 23b and 23c. The indicator surfaces 23b and 23b are at different locations from the reference surface 23a and the initial plasmon generator 50P in the X direction. In the example shown in FIG. 18A, the indicator surface 23b is located to the left of the reference surface 23a and the initial plasmon generator 50P in FIG. 18A. The indicator surface 23c is located to the right of the reference surface 23a and the initial plasmon generator 50P in FIG. 18A.

The indicator surfaces 23b and 23c are formed by taper-etching the initial dielectric layer 23P, as is the reference surface 23a. The indicator surfaces 23b and 23c may be formed simultaneously with the formation of the reference surface 23a. Each of the indicator surfaces 23b and 23c is inclined with respect to the direction perpendicular to the top surface 22a of the cladding layer 22.

Each of the indicator surfaces 23b and 23c has at least one edge parallel to the first imaginary plane P1. The at least one edge serves as the at least one indicator. In the example shown in FIG. 18A, the indicator surface 23b has a third edge 23b1 closest to the top surface 22a of the cladding layer 22, and a fourth edge 23b2 opposite to the third edge 23b1. The indicator surface 23c has a fifth edge 23c1 closest to the top surface 22a of the cladding layer 22, and a sixth edge 23c2 opposite to the fifth edge 23c1. Each of the third to sixth edges 23b1, 23b2, 23c1 and 23c2 is located at a predetermined distance of zero or more from the first imaginary plane P1.

Now, we define a first region and a second region located on opposite sides of the first imaginary plane P1 as follows. The first region is a region where the first and second inclined surfaces 51a1 and 51a2 are present. The at least one indicator may be located in the first imaginary plane or in the first or second region. In the example shown in FIGS. 18A and 18C, the fourth edge 23b2 is located in the first imaginary plane P1. The third, fifth and sixth edges 23b1, 23c1 and 23c2 are located in the first region. As shown in FIG. 18A, the sixth edge 23c2 is particularly located at the same distance from the first imaginary plane P1 as is the first imaginary straight line L1.

As a concrete example of the second method, we will describe the case of controlling the location of the first edges E11 and E21 of the first and second inclined surfaces 51a1 and 51a2 by using the fourth edge 23b2 and the sixth edge 23c2 as a reference. The indicator surfaces 23b and 23c may be covered with a portion 50Q (see FIG. 18C) of the metal film formed in the step of forming the initial plasmon generator 50P, the portion 50Q being other than the portion to be made into the initial plasmon generator 50P later. In such a case, the step of etching the initial plasmon generator 50P also etches the portion 50Q. In the etching step, the etching proceeds and thereby exposes the indicator surfaces 23b and 23c which have been covered with the portion 50Q. Thus, by identifying the fourth edge 23b2 of the indicator surface 23b with an electron microscope, it is possible to identify the location at which the medium facing surface 80 is to be formed. Further, identifying the sixth edge 23c2 of the indicator surface 23c with an electron microscope makes it possible to identify the location of the first edges E11 and E21 of the first and second inclined surfaces 51a1 and 51a2. In this way, in the step of etching the initial plasmon generator 50P, the location of the first edges E11 and E21 of the first and second inclined surfaces 51a1 and 51a2 can be controlled by identifying the fourth edge 23b2 and the sixth edge 23c2.

In the first method, a portion of the reference surface 23a may be covered with the second mask 62, or a dielectric film of the same material as the cladding layer 22 may be formed to extend along the reference surface 23a. It is thereby possible to prevent the second edge 23a2 from becoming fuzzy due to etching undergone by the reference surface 23a when the initial plasmon generator 50P is etched. Similarly, in the second method, the aforementioned dielectric film may be formed to extend along the indicator surfaces 23b and 23c. This makes it possible to prevent the at least one indicator from becoming fuzzy due to etching undergone by the indicator surfaces 23b and 23c when the portion 50Q is etched.

The first method may control the location of the second edges E12 and E22 of the first and second inclined surfaces 51a1 and 51a2 in the same manner as that in which the location of the first edges E11 and E21 of the first and second inclined surfaces 51a1 and 51a2 is controlled by using the second edge 23a2 of the reference surface 23a as a reference. Similarly, the second method may control the location of the second edges E12 and E22 of the first and second inclined surfaces 51a1 and 51a2 in the same manner as that in which the location of the first edges E11 and E21 of the first and second inclined surfaces 51a1 and 51a2 is controlled by using the fourth edge 23b2 and the sixth edge 23c2 as a reference. In such a case, the upward protrusion (the dielectric layer 23) may have an indicator surface having a seventh edge parallel to the first imaginary plane P1. The seventh edge is located at the same distance from the first imaginary plane P1 as is the second imaginary straight line L2. The seventh edge may be used as a reference in controlling the location of the second edges E12 and E22 of the first and second inclined surfaces 51a1 and 51a2.

Each of the first and second methods may control the location of the first edges E11 and E21 only, the location of the second edges E12 and E22 only, or both of the location of the first edges E11 and E21 and the location of the second edges E12 and E22.

Figure 19A:
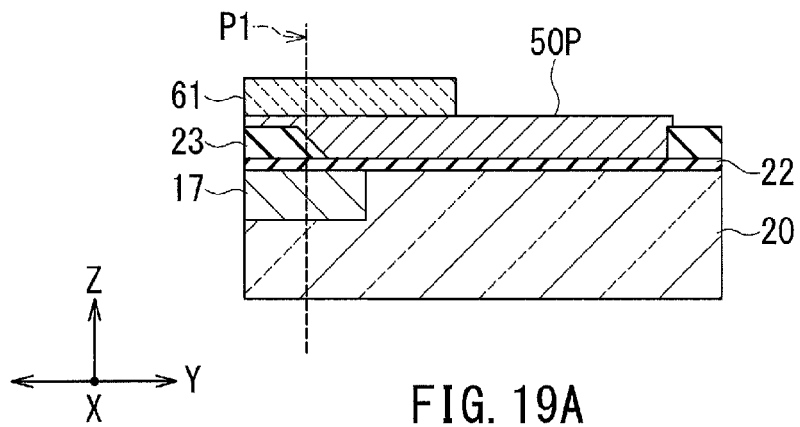
FIGS. 19A and 19B are cross-sectional views showing a step that follows the step shown in FIG. 17.
Figure 19B:
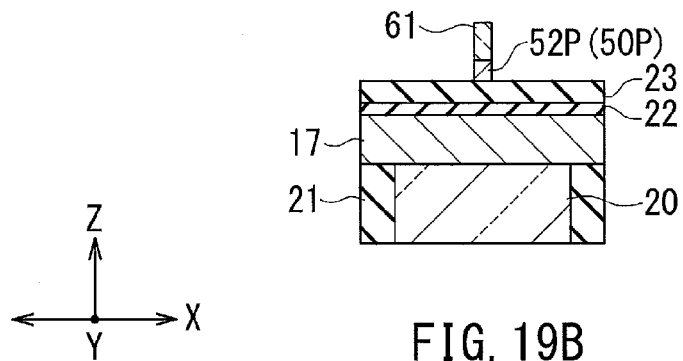
Figure 20A:
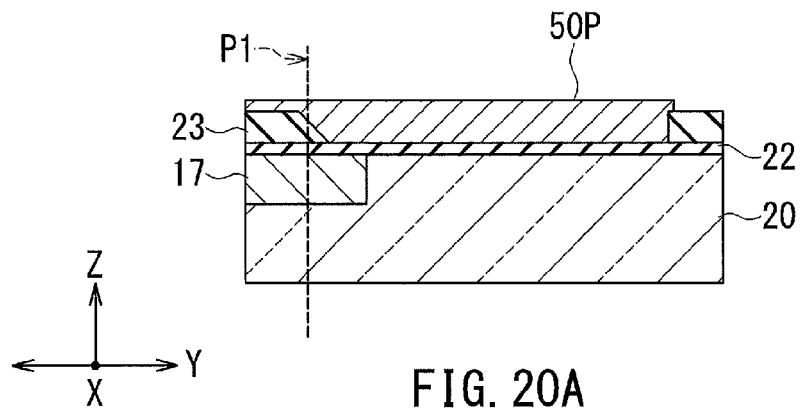
FIGS. 20A and 20B are cross-sectional views showing a step that follows the step shown in FIGS. 19A and 19B.
Figure 20B:
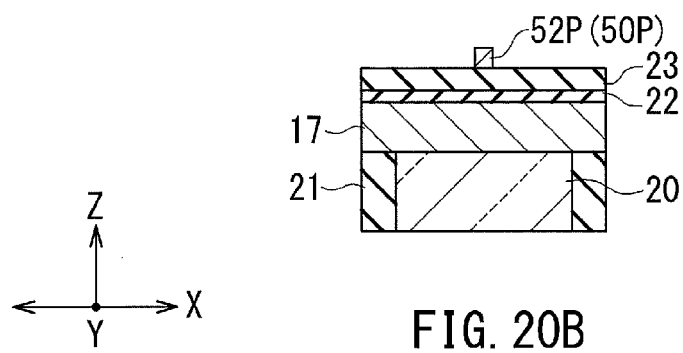

FIGS. 19A and 19B show a step that follows the etching of the initial plasmon generator 50P. In this step, the second mask 62 is removed. Then, the first mask 61 is removed as shown in FIGS. 20A and 20B.

Now, steps to follow the step shown in FIGS. 20A and 20B will be described with reference to FIGS. 6 to 9. First, the dielectric layer 24 is formed over the entire top surface of the stack. The dielectric layer 24 is then polished by, for example, CMP, until the initial plasmon generator 50P is exposed. Then, the dielectric layer 25 is formed on a portion of the top surface of each of the initial plasmon generator 50P and the dielectric layer 24 in the vicinity of the first imaginary plane P1, and the dielectric layer 26 is formed on another portion of the top surface of the dielectric layer 24 at a location away from the first imaginary plane P1. The heat sink 27 is then formed on another portion of the top surface of the initial plasmon generator 50P. The heat sink 27 is formed such that a portion thereof rides over the dielectric layer 26.

Next, the cladding layer 22 and the dielectric layers 23, 24 and 26 are selectively etched to form therein two openings for exposing the top surfaces of the first layers of the second coupling sections 16A and 16B. Then, the second layers of the second coupling sections 16A and 16B are formed on the first layers thereof. The dielectric layer 28 is then formed around the heat sink 27 and the second layers of the second coupling sections 16A and 16B. The nonmagnetic metal film 29 is then formed on the dielectric layer 25 and the heat sink 27. Next, the main pole 30 is formed on the nonmagnetic metal film 29, and the coupling layer 33 is formed on the dielectric layer 28 and the second layers of the second coupling sections 16A and 16B.

Next, the nonmagnetic metal film 31 is formed to cover the main pole 30. Then, the heat sink 32 is formed around the main pole 30. The insulating film 35 is then formed over the entire top surface of the stack. Then, the first layer 34A of the coil 34 is formed on the insulating film 35. The insulating layer 36 is then formed over the entire top surface of the stack. The nonmagnetic metal film 31, the insulating film 35 and the insulating layer 36 are then polished by, for example, CMP, until the main pole 30, the heat sink 32, the coupling layer 33 and the first layer 34A are exposed. Next, the insulating layer 37 is formed over the entire top surface of the stack. The insulating layer 37 is then selectively etched to form therein an opening for exposing the top surface of the main pole 30 and an opening for exposing the top surface of the coupling layer 33.

Next, the first layer 38A of the first yoke portion 38 is formed on the main pole 30 and the insulating layer 37, and the coupling layer 39 is formed on the coupling layer 33. Then, the insulating film 40 is formed over the entire top surface of the stack. The insulating layer 37 and the insulating film 40 are then selectively etched to form therein openings for exposing the coil connection 34E (see FIG. 10) of the first layer 34A of the coil 34. Then, the second layer 34B of the coil 34 is formed on the insulating film 40 and the coil connection 34E. Next, the insulating layer 41 is formed over the entire top surface of the stack. The insulating film 40 and the insulating layer 41 are then polished by, for example, CMP, until the first layer 38A, the coupling layer 39 and the second layer 34B are exposed.

Next, the insulating layer 42 is formed on the second layer 34B of the coil 34 and the insulating layer 41. The second layer 38B of the first yoke portion 38 is then formed on the first layer 38A of the first yoke portion 38, the coupling layer 39 and the insulating layer 42. Next, the insulating layer 43 is formed over the entire top surface of the stack. The insulating layer 43 is then polished by, for example, CMP, until the second layer 38B is exposed. Then, the protective layer 44 is formed to cover the second layer 38B and the insulating layer 43. Wiring, terminals, and other components are then formed on the top surface of the protective layer 44. When the substructure is completed thus, the step of forming the medium facing surface 80 is performed. A protective film for covering the medium facing surface 80 may be formed thereafter. Being provided with the medium facing surface 80, each pre-head portion becomes a thermally-assisted magnetic recording head.

The step of forming the medium facing surface 80 includes the step of polishing the surface of each pre-head portion that has resulted from cutting the substructure, and the step of forming a rail on the polished surface for allowing the slider to fly.

The step of forming the near-field light generating surface 52a is performed simultaneously with the step of forming the medium facing surface 80. In the step of forming the near-field light generating surface 52a, the near-field light generating surface 52a is formed by polishing the initial plasmon generator 50P so that the initial front protrusion 52P and the initial plasmon generator 50P become the front protrusion 52 and the plasmon generator 50, respectively.

The foregoing description of the manufacturing method for the thermally-assisted magnetic recording head includes the description of the manufacturing method for the plasmon generator 50 according to the present embodiment. The manufacturing method for the plasmon generator 50 according to the present embodiment includes the steps of forming the initial plasmon generator 50P as shown in FIGS. 14A and 14B; forming the first mask 61 on the initial plasmon generator 50P as shown in FIGS. 15A and 15B; and forming the second mask 62 on the initial plasmon generator 50P and the first mask 61 as shown in FIGS. 16A to 16C. The manufacturing method for the plasmon generator 50 according to the present embodiment further includes the step of etching the initial plasmon generator 50P using the first and second masks 61 and 62 as shown in FIG. 17, and the step of forming the near-field light generating surface 52a.

The manufacturing method for the plasmon generator 50 according to the present embodiment further includes the step of forming the underlying section before the formation of the initial plasmon generator 50P, as shown in FIGS. 12A to 13B.

The specific functions and effects of the thermally-assisted magnetic recording head according to the present embodiment will now be described. The plasmon generator 50 according to the present embodiment includes the main body 51 and the front protrusion 52. In the plasmon generator 50, surface plasmons are excited on the main body 51, and the near-field light generating surface 52a of the front protrusion 52 generates near-field light based on the surface plasmons. Heat is generated particularly at the near-field light generating surface 52a of the front protrusion 52. Since the main body 51 is greater in volume than the front protrusion 52, the main body 51 provides the heat sink effect to dissipate the heat generated at the front protrusion 52. Minimizing the distance between the near-field light generating surface 52a and the end of the main body 51 closest to the near-field light generating surface 52a makes it possible for the plasmon generator 50 to achieve enhanced efficiencies of heat dissipation and generation of near-field light.

Conventionally, however, any attempts to enhance the efficiencies of heat dissipation and generation of near-field light at the plasmon generator by modifying the shape of the plasmon generator have resulted in difficulty in accurately controlling the width of the near-field light generating surface. This will be described below with reference to a plasmon generator 150 of a comparative example.

Figure 21:
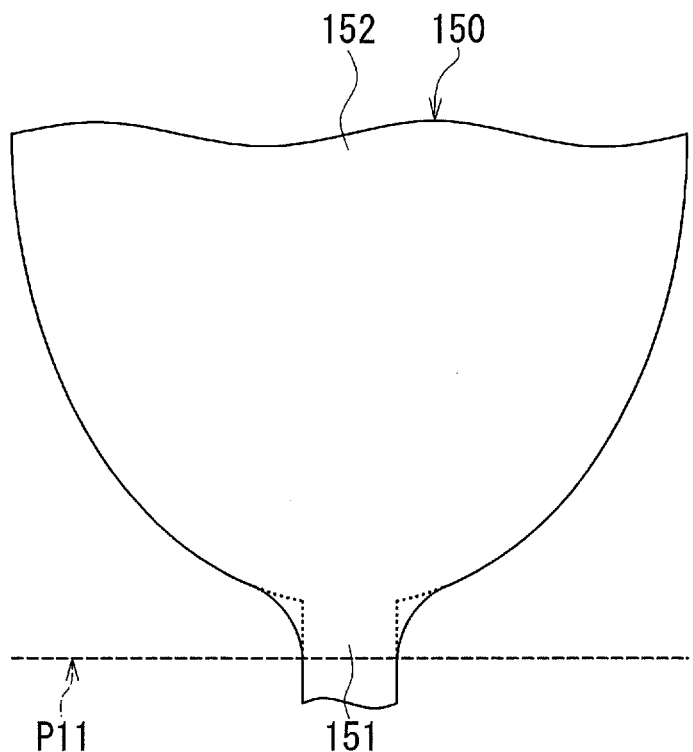
FIG. 21 is a plan view showing a step of a method of manufacturing a plasmon generator of a comparative example.
Figure 21:
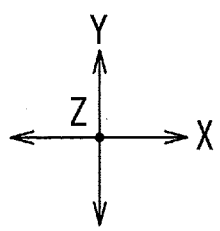

The plasmon generator 150 of the comparative example includes a narrow portion 151 and a wide portion 152, the narrow portion 152 having a near-field light generating surface and an end opposite thereto, the wide portion 152 being connected to the end of the narrow portion 151. FIG. 21 is a plan view showing a step of a manufacturing method for the plasmon generator 150 of the comparative example. The manufacturing method for the plasmon generator 150 first forms a metal film by sputtering, for example. Then, a photoresist mask (not illustrated) is formed on the metal film. The photoresist mask has the same planar shape as that of the plasmon generator 150 of the comparative example. Then, the metal film is etched by, for example, IBE, using the photoresist mask as an etching mask. The etching mask is then removed. Thereafter, the step of forming the near-field light generating surface is performed to make the metal film into the plasmon generator 150 of the comparative example. In FIG. 21, the reference symbol P11 indicates an imaginary plane including the near-field light generating surface. For the sake of convenience, in FIG. 21 the metal film before the formation of the near-field light generating surface is denoted by the reference numeral 150.

In FIG. 21, the dotted lines indicate the design geometry of the portion near the boundary between the narrow portion 151 and the wide portion 152. As shown in FIG. 21, the design width of the narrow portion 151 in a direction parallel to the imaginary plane P11 (the X direction) is constant regardless of distance from the imaginary plane P11. However, with the manufacturing method for the plasmon generator 150 of the comparative example, it is difficult to accurately form the portion near the boundary between narrow portion 151 and wide portion 152 due to the limit of photolithography. When actually formed, the portion near the boundary between the narrow portion 151 and the wide portion 152 is shaped with rounded corners, as shown by solid lines in FIG. 21. Consequently, for the plasmon generator 150 of the comparative example, if attempts are made to reduce the distance between the near-field light generating surface (the imaginary plane P11) and the end of the wide portion 152 closest to the near-field light generating surface so as to enhance the efficiencies of heat dissipation and generation of near-field light at the plasmon generator 150, the width of the narrow portion 151 greatly varies to make it difficult to accurately control the width of the near-field light generating surface.

In contrast, the present embodiment makes it possible for the plasmon generator 50 to provide enhanced efficiencies of heat dissipation and generation of near-field light, and allows for accurate control of the width of the near-field light generating surface 52a. This will be described in detail below.

First, for the plasmon generator 50 according to the present embodiment, we will define lower neck height and upper neck height as follows. Lower neck height is the distance from the medium facing surface 80 to the first edges E11 and E21 of the first and second inclined surfaces 51a1 and 51a2. Upper neck height is the distance from the medium facing surface 80 to the second edges E12 and E22 of the first and second inclined surfaces 51a1 and 51a2. In the present embodiment, the upper neck height is greater than the lower neck height. The present embodiment is thus able to make the lower neck height as small as 10 nm or below while allowing the upper neck height to be relatively large.

Being able to provide a small lower neck height means being able to provide a small distance between the near-field light generating surface 52a and the end of the main body 51 closest to the near-field light generating surface 52a, that is, the first edges E11 and E21 of the first and second inclined surfaces 51a1 and 51a2. Consequently, proving a small lower neck height allows for enhancement of the heat sink effect of the main body 51, that is, enhancement of the efficiency of heat dissipation at the plasmon generator 50. Further, providing a small lower neck height allows for a reduction in the distance over which the surface plasmons excited on the plasmon exciting section 51c of the main body 51 propagate through the surface of the front protrusion 52, thus allowing for enhancement of the efficiency of generation of near-field light at the plasmon generator 50.

On the other hand, providing a large upper neck height allows the boundary between the main body 51 and the front protrusion 52 to be located at a large distance from the medium facing surface 80. This makes it possible to prevent variations of the width of the front protrusion 52, thereby allowing for accurate control the width of the near-field light generating surface 52a. For the reasons described above, the present embodiment makes it possible for the plasmon generator 50 to provide enhanced efficiencies of heat dissipation and generation of near-field light, and allows for accurate control of the width of the near-field light generating surface 52a.

Further, according to the present embodiment, in order to form the first and second inclined surfaces 51a1 and 51a2 and the initial front protrusion 52P, the initial plasmon generator 50P is etched using the first mask 61 for defining the width of the front protrusion 52 in the X direction (the first direction) and the second mask 62 for defining the location of the first and second inclined surfaces 51a1 and 51a2.

Where IBE is employed to etch the initial plasmon generator 50P, the ion beams are allowed to travel in a direction parallel to the two side surfaces of the protruding portion of the first mask 61 and at an angle with respect to the direction perpendicular to the top surface 22a of the cladding layer 22 (the base portion), as shown in FIG. 17. Such etching results in the formation of the initial front protrusion 52P having two side surfaces contiguous with the two side surfaces of the protruding portion of the first mask 61. The two side surfaces of the initial front protrusion 52P are perpendicular to the X direction (the first direction). Further, the location and shape of the first and second inclined surfaces 51a1 and 51a2 can be controlled by the location of the front end face of the second mask 62 and etching conditions such as the direction of travel of the ion beams, etching duration, etc. Consequently, the present embodiment allows for accurate formation of the front protrusion 52 and the first and second inclined surfaces 51a1 and 51a2.

Further, according to the present embodiment, it is possible to control the location of the first edges E11 and E21 of the first and second inclined surfaces 51a1 and 51a2 by using the first or second method. The present embodiment thus allows for accurate control of the lower neck height and the upper neck height.

The other effects of the present embodiment will now be described. In the present embodiment, when viewed in the direction perpendicular to the medium facing surface 80, the shield 17 overlaps only the first region R1 of the front end face 20a of the core 20, the first region R1 being located closer to the main pole 30 than the other region of the front end face 20a. The present embodiment thus allows the end face 30a of the main pole 30 and the end face 17a of the shield 17 to be located closer to each other when compared with the case where the shield 17 is located on the rear side in the direction of travel of the recording medium 90 relative to the core 20. More specifically, the present embodiment makes it possible to bring the end face 30a and the end face 17a into close proximity to each other easily so that the distance D falls within the range of 50 to 300 nm. Consequently, the present embodiment allows the functions of the shield 17 to be effectively exerted to increase the gradient of the write magnetic field strength. The lower limit of the distance D (50 nm) is a distance necessary to place the near-field light generating surface 52a between the end face 30a and the end face 17a. To increase the gradient of the write magnetic field strength, the distance D should be as small as possible. In view of the foregoing, the distance D is preferably in the range of 50 to 300 nm and more preferably in the range of 50 to 100 nm.

In the present embodiment, the near-field light generating surface 52a of the front protrusion 52 of the plasmon generator 50 is located in the medium facing surface 80 and interposed between the end face 30a and the end face 17a. This makes it possible to produce a write magnetic field of a large gradient of the write magnetic field strength in the vicinity of the near-field light generating surface 52a. Consequently, the present embodiment allows for enhancement of linear recording density.

If the shield 17 and the front end face 20a of the core 20 are opposed to each other over a large area, the light 60 propagating through the core 20 may pass through the front end face 20a and enter the shield 17, thereby causing the shield 17 to be heated and expand. This will result in the problem that the shield 17 will protrude toward the recording medium 90 and thus readily collide with the recording medium 90. In order to avoid this problem, the distance between the medium facing surface 80 and the recording medium 90 could be increased. However, this would lead to deterioration in write characteristics such as overwrite property or to an increase in error rate. In the present embodiment, in contrast, the shield 17 overlaps only the first region R1 of the front end face 20a when viewed in the direction perpendicular to the medium facing surface 80. More specifically, the shield 17 is not present between at least the second region R2 of the front end face 20a and the medium facing surface 80. The present embodiment thus avoids the configuration in which the shield 17 and the front end face 20a of the core 20 are opposed to each other over a large area, thereby precluding the aforementioned problem.

To preclude the aforementioned problem with higher reliability, the region of the front end face 20a that the shield 17 overlaps when viewed in the direction perpendicular to the medium facing surface 80 may be only a region extending from a position that is located closer to the first edge E1 (not coinciding with the first edge E1) than is the midpoint position C to the first edge E1.

Further, in the present embodiment, the shield 17 is shaped to be greater in dimension in the track width direction (the X direction) than in dimension in the direction perpendicular to the top surface 1a of the substrate 1 (the Z direction). Consequently, even though the shield 17 overlaps only the first region R1 of the front end face 20a, it is possible to connect the two first coupling sections 15A and 15B to two portions of the shield 17 that are opposite in the track width direction.

In the present embodiment, the shield 17 formed of a magnetic metal is provided in the vicinity of the near-field light generating surface 52a on the leading side of the plasmon generator 50. Since the top surface 17c of the shield 17 is located close to the plasmon exciting section 51c of the plasmon generator 50, surface plasmons are excited also on the top surface 17c. Then, the electric line of force produced by the surface plasmons on the plasmon exciting section 51c and the electric line of force produced by the surface plasmons on the top surface 17c of the shield 17 are coupled to each other in the vicinity of the near-field light generating surface 52a. This produces a high-density electric line of force in a narrow area in the vicinity of the near-field light generating surface 52a. The spread of the near-field light generated by the near-field light generating surface 52a is thereby suppressed. Thus, the shield 17 of the present embodiment has also the function of suppressing the spread of near-field light. By virtue of this function, the present embodiment allows for a reduction in track width to achieve higher recording density.

Further, in the present embodiment, the maximum length of each of the first and second non-overlapping portions 17B and 17C of the shield 17 in the direction perpendicular to the medium facing surface 80 is greater than the length of the overlapping portion 17A of the shield 17 in that direction. This feature of the present embodiment makes it possible to enhance the aforementioned function of the shield 17 while preventing magnetic flux from being saturated at some midpoint in the shield 17.

Modification Examples

Figure 22:
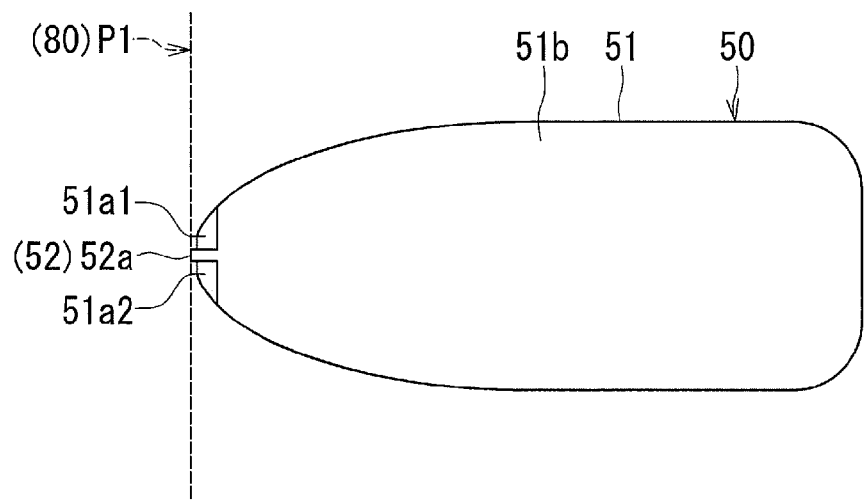
FIG. 22 is a plan view showing a first modification example of the plasmon generator according to the first embodiment of the invention.
Figure 22:
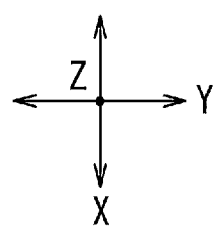

First to fourth modification examples of the plasmon generator 50 according to the present embodiment will now be described. FIG. 22 is a plan view showing the first modification example of the plasmon generator 50. In the first modification example, the top surface 51b of the main body 51 of the plasmon generator 50 is shaped differently than in FIGS. 1 and 2. More specifically, in the first modification example, the width of the top surface 51b in the track width direction (the X direction) gradually increases with increasing distance from the first imaginary plane P1 (the medium facing surface 80), and then becomes constant.

Figure 23:
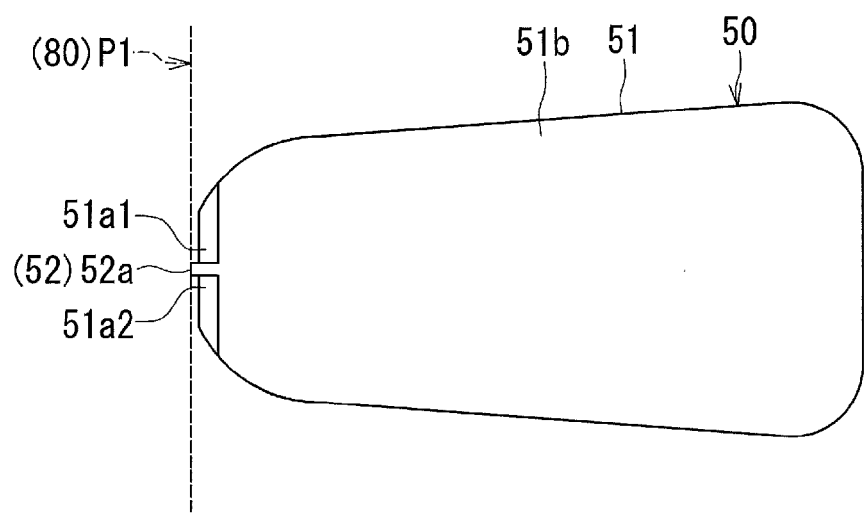
FIG. 23 is a plan view showing a second modification example of the plasmon generator according to the first embodiment of the invention.
Figure 23:
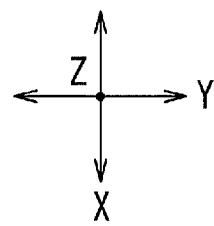

FIG. 23 is a plan view showing the second modification example of the plasmon generator 50. In the second modification example, the top surface 51b of the main body 51 of the plasmon generator 50 is shaped differently than in FIGS. 1 and 2. More specifically, in the second modification example, most part of the top surface 51b increases in width in the track width direction (the X direction) with increasing distance from the first imaginary plane P1 (the medium facing surface 80).

The three plasmon generators 50 shown in FIG. 2, FIG. 22 and FIG. 23 are different from each other in the length of the first and second inclined surfaces 51a1 and 51a2 in the track width direction (the X direction) because of the differences in shape among the top surfaces 51b of the main bodies 51 of the plasmon generators 50. Increasing the length of the first and second inclined surfaces 51a1 and 51a2 allows for enhancement of the heat sink effect of the main body 51, that is, enhancement of the efficiency of heat dissipation at the plasmon generator 50.

The manufacturing method for the plasmon generator 50 according to the present embodiment allows the method for forming the front protrusion 52 and the first and second inclined surfaces 51a1 and 51a2 to remain the same even if the shape of the top surface 51b of the main body 51 of the plasmon generator 50 varies. Consequently, according to the present embodiment, the length of the first and second inclined surfaces 51a1 and 51a2 in the track width direction (the X direction) can be varied without changing the upper or lower neck height or the width of the front protrusion 52 in the track width direction (the X direction).

Figure 24:
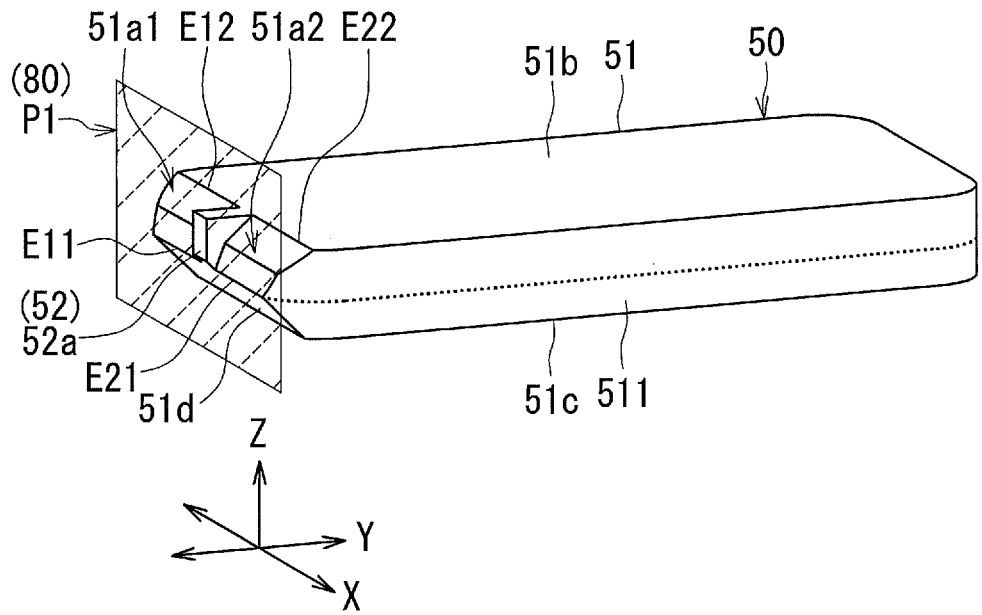
FIG. 24 is a perspective view showing a third modification example of the plasmon generator according to the first embodiment of the invention.

FIG. 24 is a perspective view showing the third modification example of the plasmon generator 50. In the third modification example, the first and second inclined surfaces 51a1 and 51a2 of the main body 51 of the plasmon generator 50 are shaped differently than in FIG. 1. More specifically, in the third modification example, each of the first inclined surface 51a1 and the second inclined surface 51a2 includes a plurality of planar portions that form different angles with respect to the second imaginary plane P2 (see FIG. 3). In the example shown in FIG. 24, the first inclined surface 51a1 includes first and second planar portions forming different angles with respect to the second imaginary plane P2, and the second inclined surface 51a2 includes third and fourth planar portions forming different angles with respect to the second imaginary plane P2.

The first planar portion of the first inclined surface 51a1 includes the first edge E11. The second planar portion of the first inclined surface 51a1 is contiguous with the first planar portion and includes the second edge E12. In the example shown in FIG. 24, the first planar portion forms a greater angle with respect to the second imaginary plane P2 than does the second planar portion.

The third planar portion of the second inclined surface 51a2 includes the first edge E21. The fourth planar portion of the second inclined surface 51a2 is contiguous with the third planar portion and includes the second edge E22. In the example shown in FIG. 24, the third planar portion forms a greater angle with respect to the second imaginary plane P2 than does the fourth planar portion.

Figure 25:
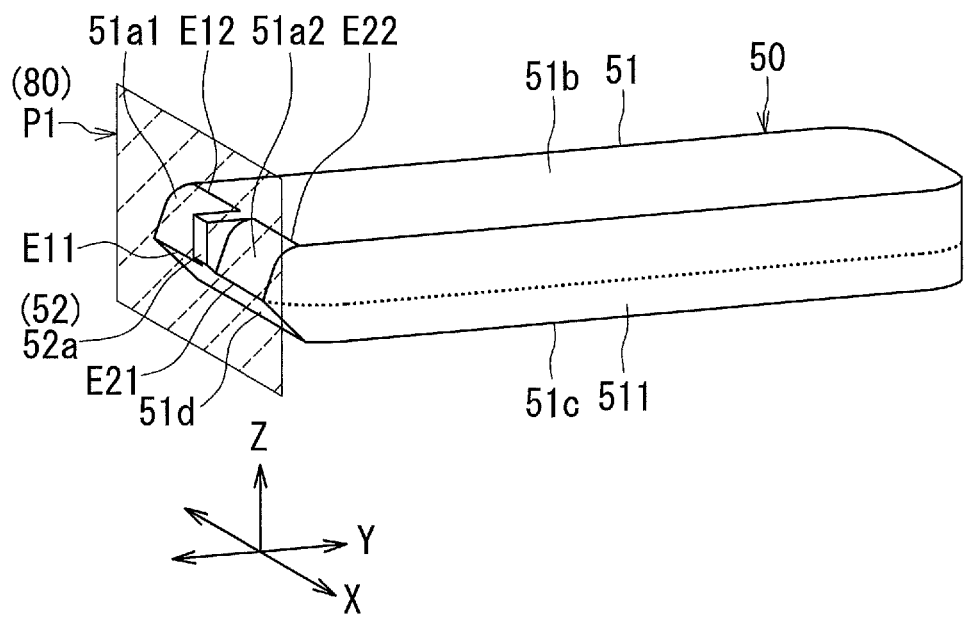
FIG. 25 is a perspective view showing a fourth modification example of the plasmon generator according to the first embodiment of the invention.

FIG. 25 is a perspective view showing the fourth modification example of the plasmon generator 50. In the fourth modification example, the first and second inclined surfaces 51a1 and 51a2 of the main body 51 of the plasmon generator 50 are shaped differently than in FIG. 1. More specifically, in the fourth modification example, at least part of each of the first and second inclined surfaces 51a1 and 51a2 is curved. In the example shown in FIG. 25, the first inclined surface 51a1 includes a planar portion including the first edge E11, and a curved portion contiguous with the planar portion and including the second edge E12. The second inclined surface 51a2 includes a planar portion including the first edge E21, and a curved portion contiguous with the planar portion and including the second edge E22.

Second Embodiment

Figure 26:
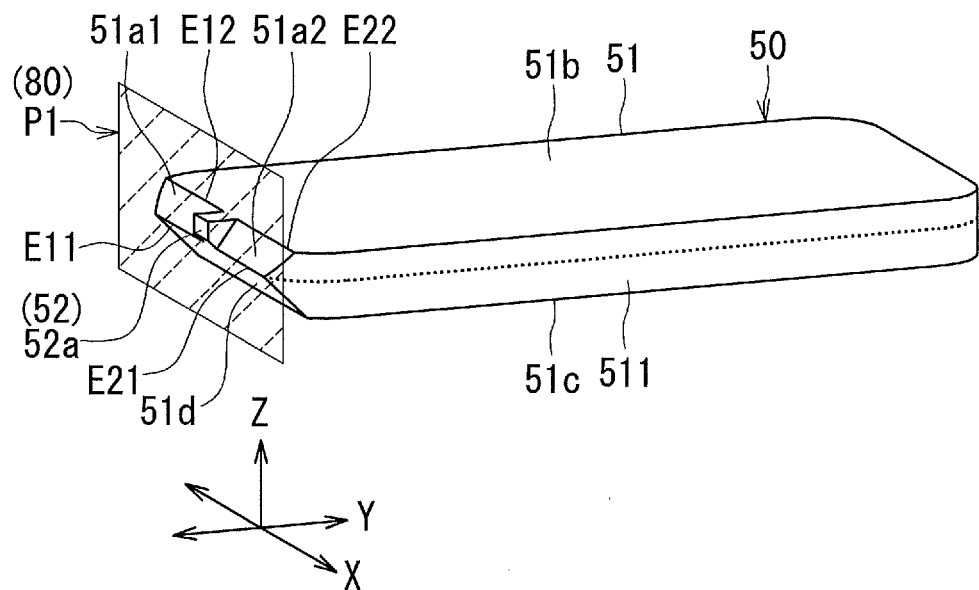
FIG. 26 is a perspective view showing a plasmon generator according to a second embodiment of the invention.

A plasmon generator according to a second embodiment of the invention will now be described with reference to FIG. 26. FIG. 26 is a perspective view showing the plasmon generator 50 according to the present embodiment. In the present embodiment, the thickness (the dimension in the Z direction) of the plasmon generator 50 and the dimension of the near-field light generating surface 52a in the Z direction are smaller than in the first embodiment.

Figure 27:
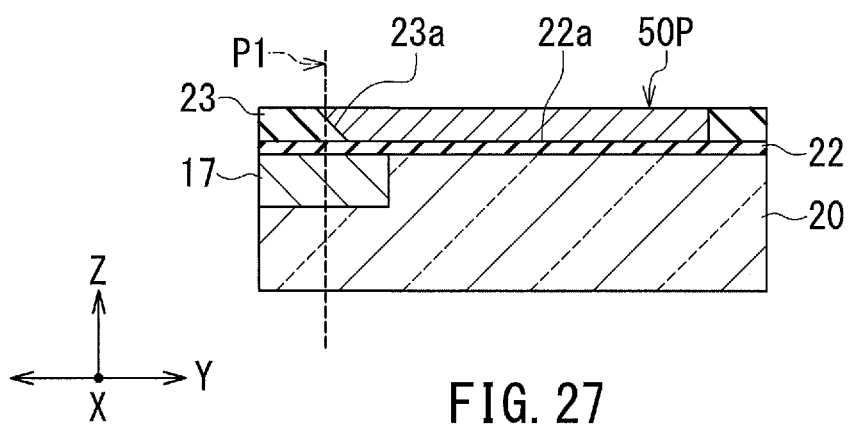
FIG. 27 is a cross-sectional view showing a step of a method of manufacturing a thermally-assisted magnetic recording head according to the second embodiment of the invention.

Reference is now made to FIG. 27 to describe how the manufacturing method for the plasmon generator 50 according to the present embodiment differs from the manufacturing method according to the first embodiment. FIG. 27 shows a stack of layers formed in the process of manufacturing a thermally-assisted magnetic recording head including the plasmon generator 50 according to the present embodiment. The components of the thermally-assisted magnetic recording head, except the plasmon generator 50, are shaped and located as in the first embodiment. FIG. 27 shows a cross section that intersects the end face 30a of the main pole 30 and that is perpendicular to the medium facing surface 80 and to the top surface 1a of the substrate 1. FIG. 27 omits the illustration of portions that are closer to the substrate 1 relative to the core 20 and the cladding layer 21. The medium facing surface 80, the substrate 1 and the main pole 30 are shown in FIGS. 8 and 9.

The step of forming the initial plasmon generator 50P in the present embodiment differs from that in the first embodiment. The present embodiment first forms a metal film on the top surface of the stack by sputtering, for example. The metal film is formed such that its portion extending along the top surface 22a of the cladding layer 22 is higher in level than the top surface of the dielectric layer 23. The metal film is then polished by, for example, CMP, until the dielectric layer 23 is exposed, whereby the top surfaces of the dielectric layer 23 and the metal film are made even with each other. This makes the metal film into the initial plasmon generator 50.

Supposing the thickness of the dielectric layer 23 in the present embodiment is the same as that in the first embodiment, the thickness of the initial plasmon generator 50P is smaller than in the first embodiment. As a result, the thickness of the plasmon generator 50 is also smaller than in the first embodiment.

The remainder of configuration, function and effects of the present embodiment are similar to those of the first embodiment.

Third Embodiment

Figure 28:
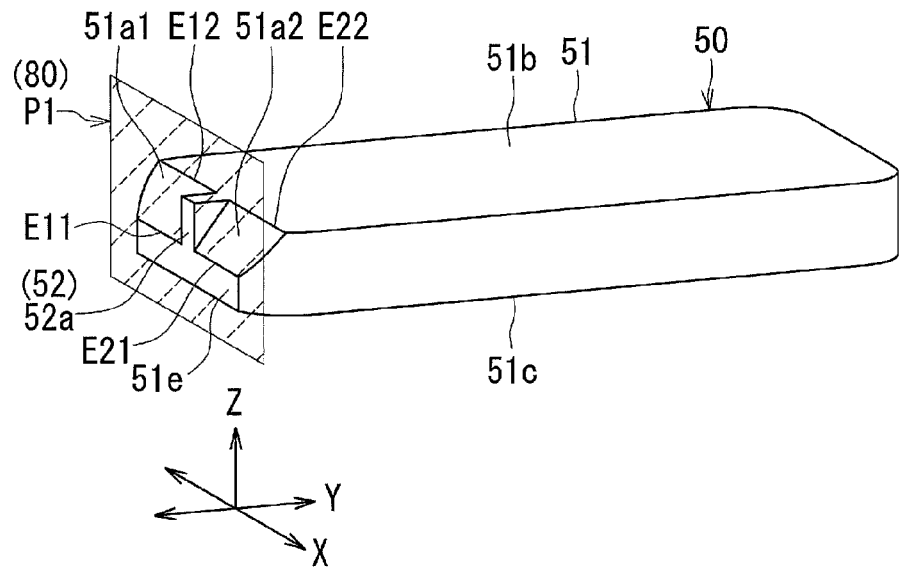
FIG. 28 is a perspective view showing a plasmon generator according to a third embodiment of the invention.

A plasmon generator according to a third embodiment of the invention will now be described with reference to FIG. 28. FIG. 28 is a perspective view showing the plasmon generator 50 according to the present embodiment. The plasmon generator 50 according to the present embodiment is configured differently than in the first embodiment in the following ways. In the present embodiment, the main body 51 of the plasmon generator 50 has an end face 51e in addition to the first and second inclined surfaces 51a1 and 51a2, the top surface 51b and the plasmon exciting section 51c. The end face 51e is included in the first imaginary plane P1. The end face 51e is located on the rear side in the direction of travel of the recording medium 90 relative to the near-field light generating surface 52a of the front protrusion 52 of the plasmon generator 50.

As has been described in relation to the first embodiment, the first edge E11 of the first inclined surface 51a1 and the first edge E21 of the second inclined surface 51a2 are located on the first imaginary straight line L1 (see FIG. 2) extending in the X direction (the first direction). In the present embodiment, the first imaginary straight line L1 is included in the first imaginary plane P1. The first edge E11 forms the boundary between the end face 51e and the first inclined surface 51a1, and the second edge E21 forms the boundary between the end face 51e and the second inclined surface 51a2. In the present embodiment, the main body 51 does not include the lower protrusion 511 (see FIGS. 1 and 3).

Figure 29:
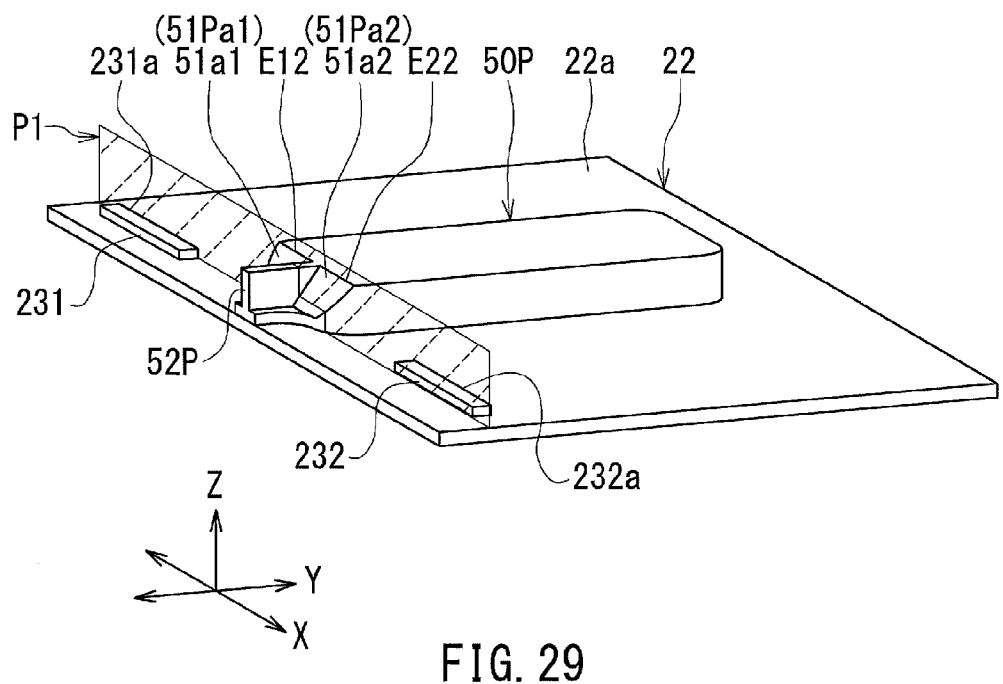
FIG. 29 is a perspective view showing a step of a method of manufacturing a thermally-assisted magnetic recording head according to the third embodiment of the invention.

Reference is now made to FIG. 29 to describe how the manufacturing method for the plasmon generator 50 according to the present embodiment differs from the manufacturing method according to the first embodiment. FIG. 29 is a perspective view showing part of a stack of layers formed in the process of manufacturing a thermally-assisted magnetic recording head including the plasmon generator 50 according to the present embodiment. The thermally-assisted magnetic recording head does not include the dielectric layer 23 described in the first embodiment section. The components of the thermally-assisted magnetic recording head, except the plasmon generator 50 and the dielectric layer 23, are shaped and located as in the first embodiment.

In place of the step of forming the dielectric layer 23 described in the first embodiment section, the present embodiment performs the step of forming two indicator protrusions 231 and 232 before the formation of the initial plasmon generator 50P. The indicator protrusions 231 and 232 are formed to protrude upward from the cladding layer 22 at locations different in the X direction from the location at which the initial plasmon generator 50P is to be formed. Each of the indicator protrusions 231 and 232 has an indicator surface. The indicator surface may be perpendicular to the top surface 22a of the cladding layer 22 or be inclined with respect to the direction perpendicular to the top surface 22a of the cladding layer 22.

The indicator surface of the indicator protrusion 231 has an edge 231a which is parallel to the first imaginary plane P1 and farthest from the top surface 22a of the cladding layer 22. The indicator surface of the indicator protrusion 232 has an edge 232a which is parallel to the first imaginary plane P1 and farthest from the top surface 22a of the cladding layer 22. The edge 231a is located in the first imaginary plane P1. The edge 232a is located at the same distance from the first imaginary plane P1 as is the second imaginary straight line L2 described in relation to the first embodiment. The edges 231a and 232a correspond to the indicator of the present invention.

The step of etching the initial plasmon generator 50P in the present embodiment differs from that in the first embodiment. In the step of etching the initial plasmon generator 50P, the initial plasmon generator 50P is etched so that the first and second inclined surfaces 51a1 and 51a2 are formed. The initial plasmon generator 50P is thus provided with a first initial inclined surface 51Pa1 including the first inclined surface 51a1 and a second initial inclined surface 51Pa2 including the second inclined surface 51a2. In the present embodiment, the initial plasmon generator 50P is etched such that the first and second initial inclined surfaces 51Pa1 and 51Pa2 intersect the first imaginary plane P1.

Further, in the step of etching the initial plasmon generator 50P, the location of the second edges E12 and E22 of the first and second inclined surfaces 51a1 and 51a2 is controlled by using the edges 231a and 232a as a reference. The indicator protrusions 231 and 232 may be covered with a portion of the metal film formed in the step of forming the initial plasmon generator 50P, the portion being other than that to be made into the initial plasmon generator 50P later. In such a case, the step of etching the initial plasmon generator 50P also etches the aforementioned portion of the metal film. In the etching step, the etching proceeds and thereby exposes the indicator protrusions 231 and 232 which have been covered with the aforementioned portion of the metal film. It thus becomes possible, by identifying the edge 231a of the indicator protrusion 231 with an electron microscope, to identify the location at which the medium facing surface 80 is to be formed. Further, identifying the edge 232a of the indicator protrusion 232 with an electron microscope makes it possible to identify the location of the second edges E12 and E22 of the first and second inclined surfaces 51a1 and 51a2. In this way, in the step of etching the initial plasmon generator 50P, the location of the second edges E12 and E22 of the first and second inclined surfaces 51a1 and 51a2 can be controlled by identifying the edges 231a and 232a.

The first edges E11 and E21 of the first and second inclined surfaces 51a1 and 51a2 shown in FIG. 28 are formed by polishing the initial plasmon generator 50P in the step of forming the near-field light generating surface 52a. The location of the first edges E11 and E21 of the first and second inclined surfaces 51a1 and 51a2 is the location at which the first and second initial inclined surfaces 51Pa1 and 51Pa2 intersect the first imaginary plane P1. The end face 51e of the main body 51 of the plasmon generator 50 is also formed in the step of forming the near-field light generating surface 52a.

The remainder of configuration, function and effects of the present embodiment are similar to those of the first embodiment.

Fourth Embodiment

Figure 30:
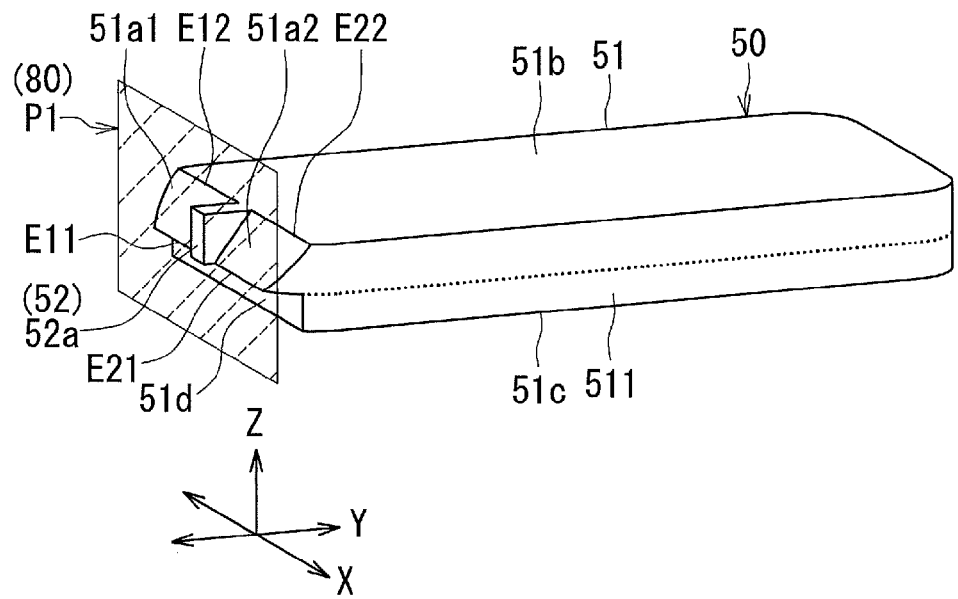
FIG. 30 is a perspective view showing a plasmon generator according to a fourth embodiment of the invention.

A plasmon generator according to a fourth embodiment of the invention will now be described with reference to FIG. 30. FIG. 30 is a perspective view showing the plasmon generator 50 according to the present embodiment. In the present embodiment, the front end face 51d of the lower protrusion 511 of the main body 51 of the plasmon generator 50 is parallel to the first imaginary plane P1.

Figure 31:
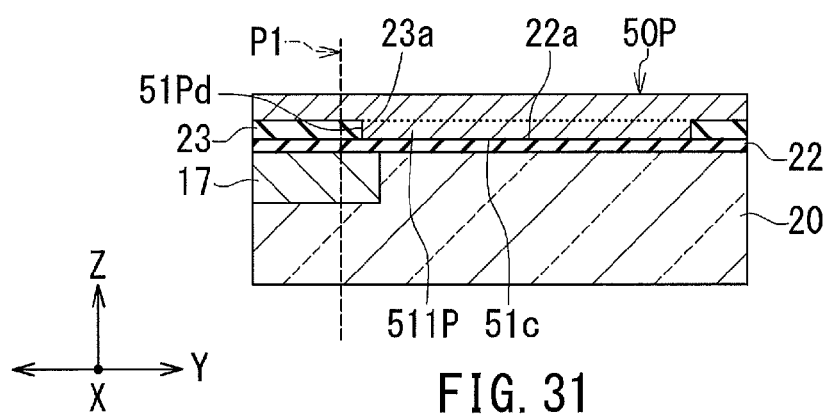
FIG. 31 is a cross-sectional view showing a step of a method of manufacturing a thermally-assisted magnetic recording head according to the fourth embodiment of the invention.

Reference is now made to FIG. 31 to describe how the manufacturing method for the plasmon generator 50 according to the present embodiment differs from the manufacturing method according to the first embodiment. FIG. 31 shows a stack of layers formed in the process of manufacturing a thermally-assisted magnetic recording head including the plasmon generator 50 according to the present embodiment. The components of the thermally-assisted magnetic recording head, except the plasmon generator 50, are shaped and located as in the first embodiment. FIG. 31 shows a cross section that intersects the end face 30a of the main pole 30 and that is perpendicular to the medium facing surface 80 and to the top surface 1a of the substrate 1. FIG. 31 omits the illustration of portions that are closer to the substrate 1 relative to the core 20 and the cladding layer 21. The medium facing surface 80, the substrate 1 and the main pole 30 are shown in FIGS. 8 and 9.

The step of forming the underlying section to underlie the plasmon generator 50 in the present embodiment is different from that in the first embodiment. In the step of forming the underlying section, the initial dielectric layer 23P, which will later become the dielectric layer 23, is etched to provide the initial dielectric layer 23P with the reference surface 23a. In the present embodiment, the initial dielectric layer 23P is etched perpendicularly so that the reference surface 23a becomes parallel to the first imaginary plane P1. Thereafter, the initial plasmon generator 50P is formed in the same manner as the first embodiment. As a result, the initial front end face 51Pd, which will later become the front end face 51d, becomes parallel to the first imaginary plane P1.

The remainder of configuration, function and effects of the present embodiment are similar to those of the first embodiment.

Fifth Embodiment

Figure 32:
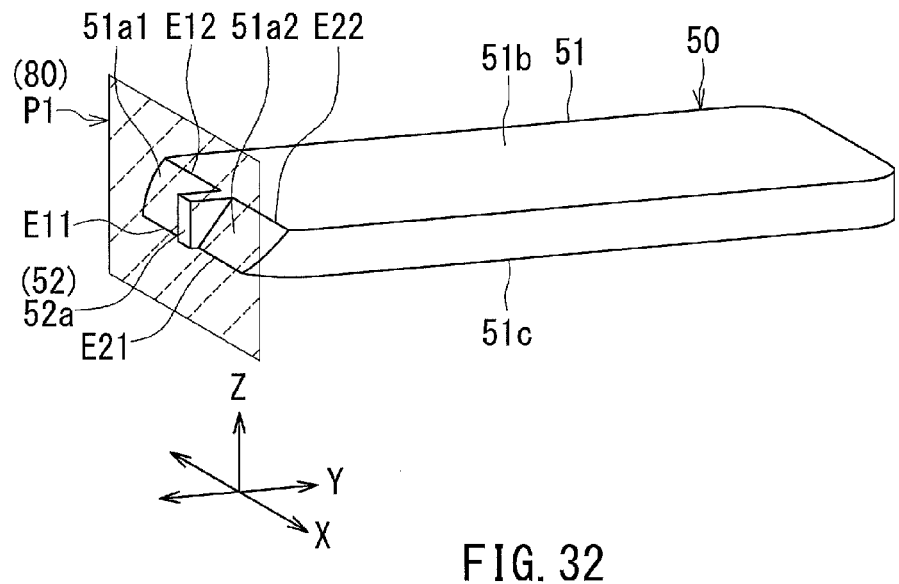
FIG. 32 is a perspective view showing a plasmon generator according to a fifth embodiment of the invention.

A plasmon generator according to a fifth embodiment of the invention will now be described with reference to FIG. 32. FIG. 32 is a perspective view showing the plasmon generator 50 according to the present embodiment. In the present embodiment, the main body 51 of the plasmon generator 50 does not include the lower protrusion 511 (see FIGS. 1 and 3). The first edge E11 forms the boundary between the plasmon exciting section 51c of the main body 51 and the first inclined surface 51a1. The second edge E21 forms the boundary between the plasmon exciting section 51c and the second inclined surface 51a2.

Figure 33:
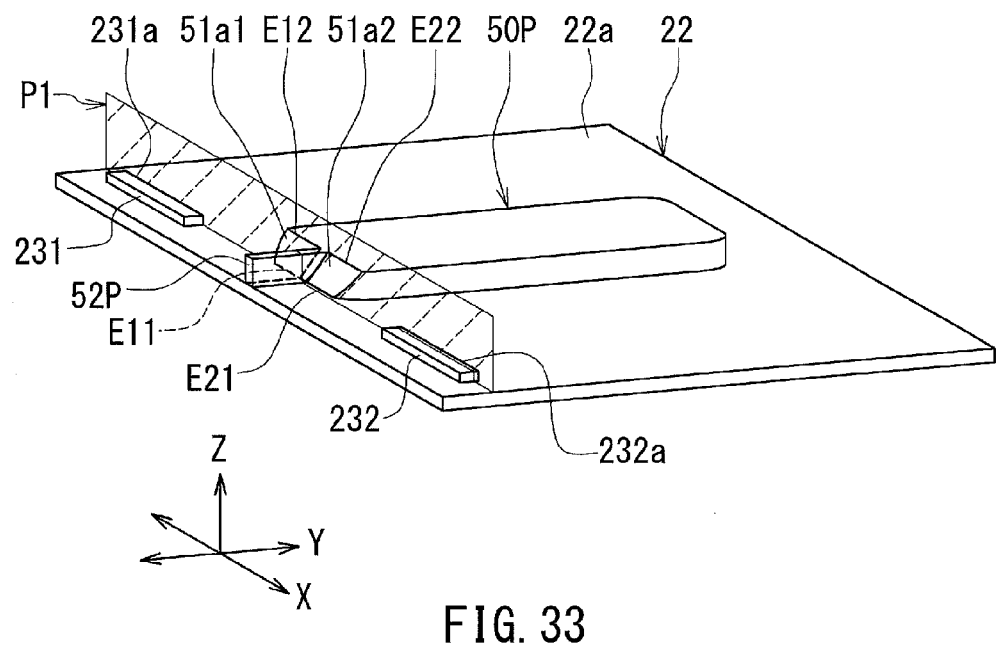
FIG. 33 is a perspective view showing a step of a method of manufacturing a thermally-assisted magnetic recording head according to the fifth embodiment of the invention.

Reference is now made to FIG. 33 to describe how the manufacturing method for the plasmon generator 50 according to the present embodiment differs from the manufacturing method according to the first embodiment. FIG. 33 is a perspective view showing part of a stack of layers formed in the process of manufacturing a thermally-assisted magnetic recording head including the plasmon generator 50 according to the present embodiment. The thermally-assisted magnetic recording head does not include the dielectric layer 23 described in the first embodiment section. The components of the thermally-assisted magnetic recording head, except the plasmon generator 50 and the dielectric layer 23, are shaped and located as in the first embodiment.

In place of the step of forming the dielectric layer 23 described in the first embodiment section, the present embodiment performs the step of forming the two indicator protrusions 231 and 232 described in the third embodiment section. In the present embodiment, the edge 232a of the indicator surface of the indicator protrusion 232 is located at the same distance from the first imaginary plane P1 as is the first imaginary straight line L1 described in the first embodiment section.

Further, the step of etching the initial plasmon generator 50P in the present embodiment is different from that in the first embodiment. In the step of etching the initial plasmon generator 50P, either one or both of the location of the first edges E11 and E21 and the location of the second edges E12 and E22 of the first and second inclined surfaces 51a1 and 51a2 are controlled by using the edges 231a and 232a as a reference, as in the third embodiment. According to the present embodiment, it is possible to identify the location of the first edges E11 and E21 of the first and second inclined surfaces 51a1 and 51a2 by identifying the edge 232a of the indicator protrusion 232 with an electron microscope.

The remainder of configuration, function and effects of the present embodiment are similar to those of the first or third embodiment.

Sixth Embodiment

Figure 34:
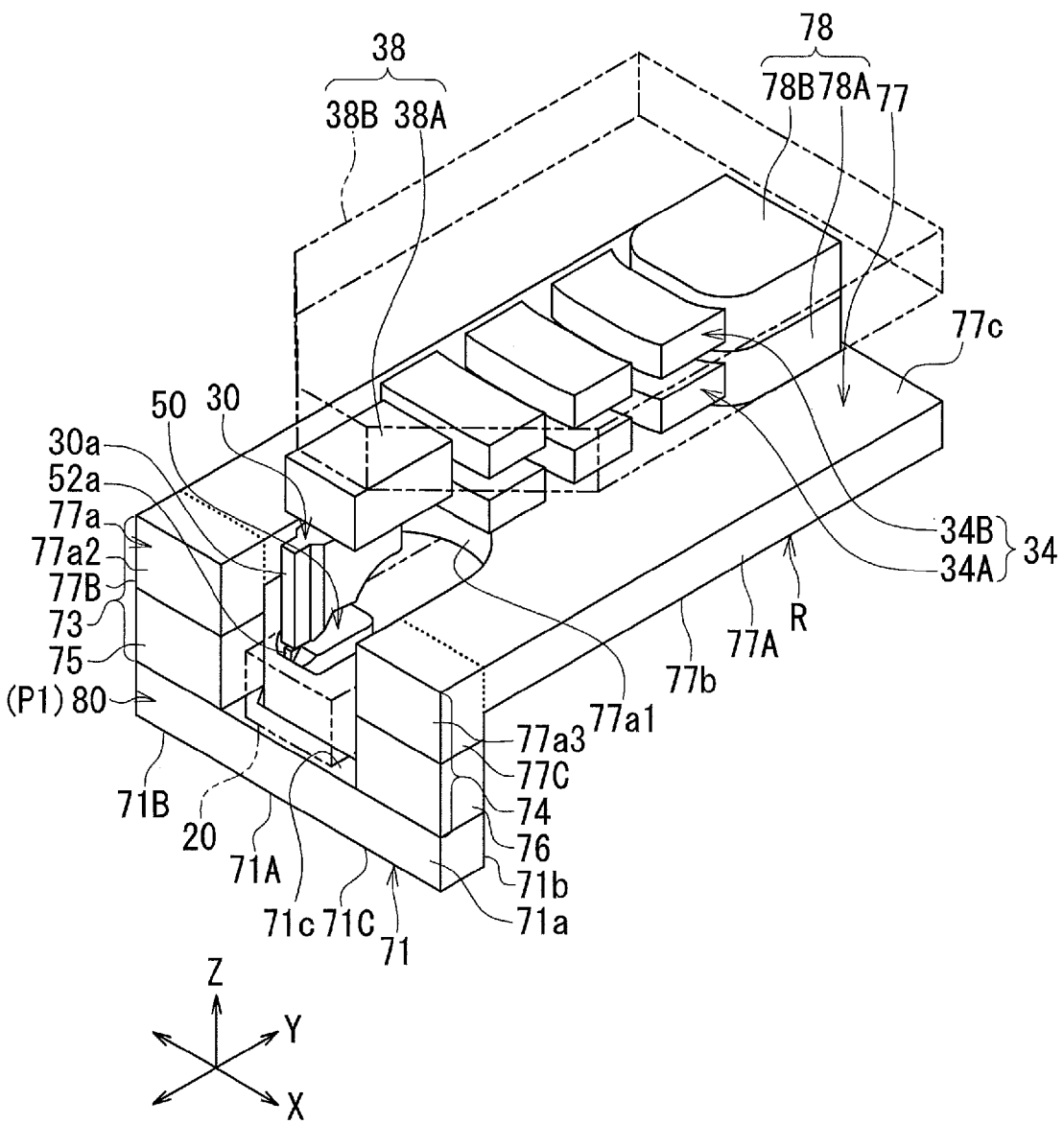
FIG. 34 is a perspective view showing the main part of a thermally-assisted magnetic recording head according to a sixth embodiment of the invention.
Figure 35:
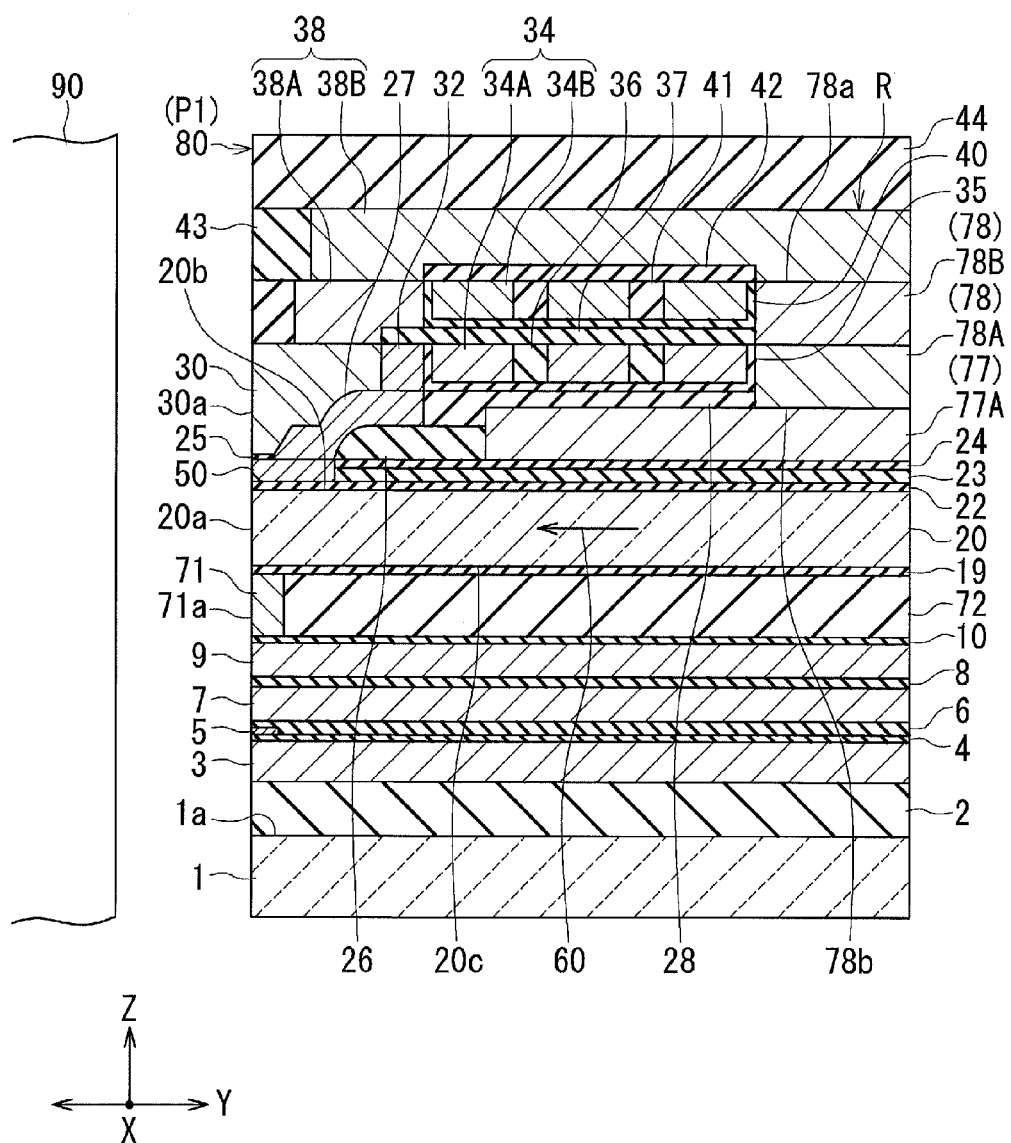
FIG. 35 is a cross-sectional view showing the configuration of the thermally-assisted magnetic recording head according to the sixth embodiment of the invention.
Figure 36:
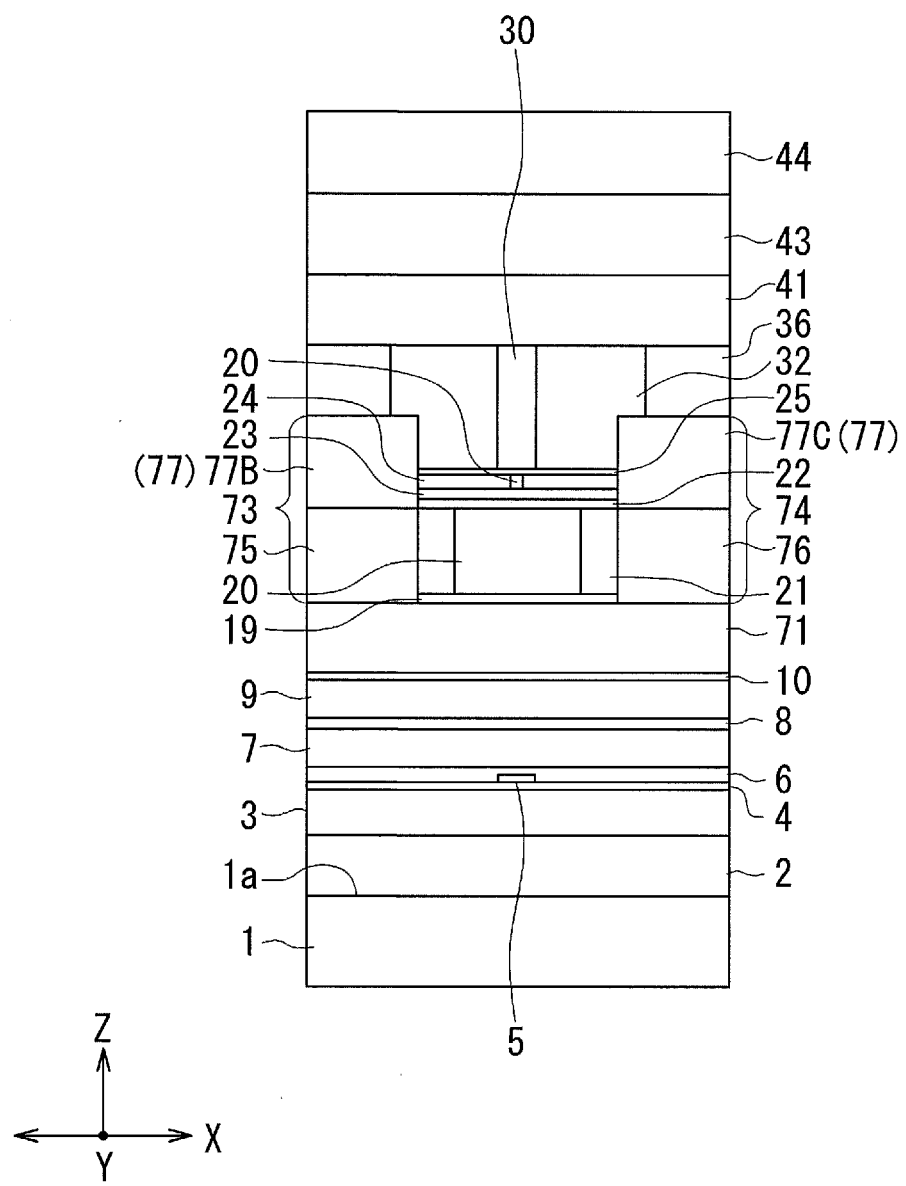
FIG. 36 is a front view showing the medium facing surface of the thermally-assisted magnetic recording head according to the sixth embodiment of the invention.
Figure 37:
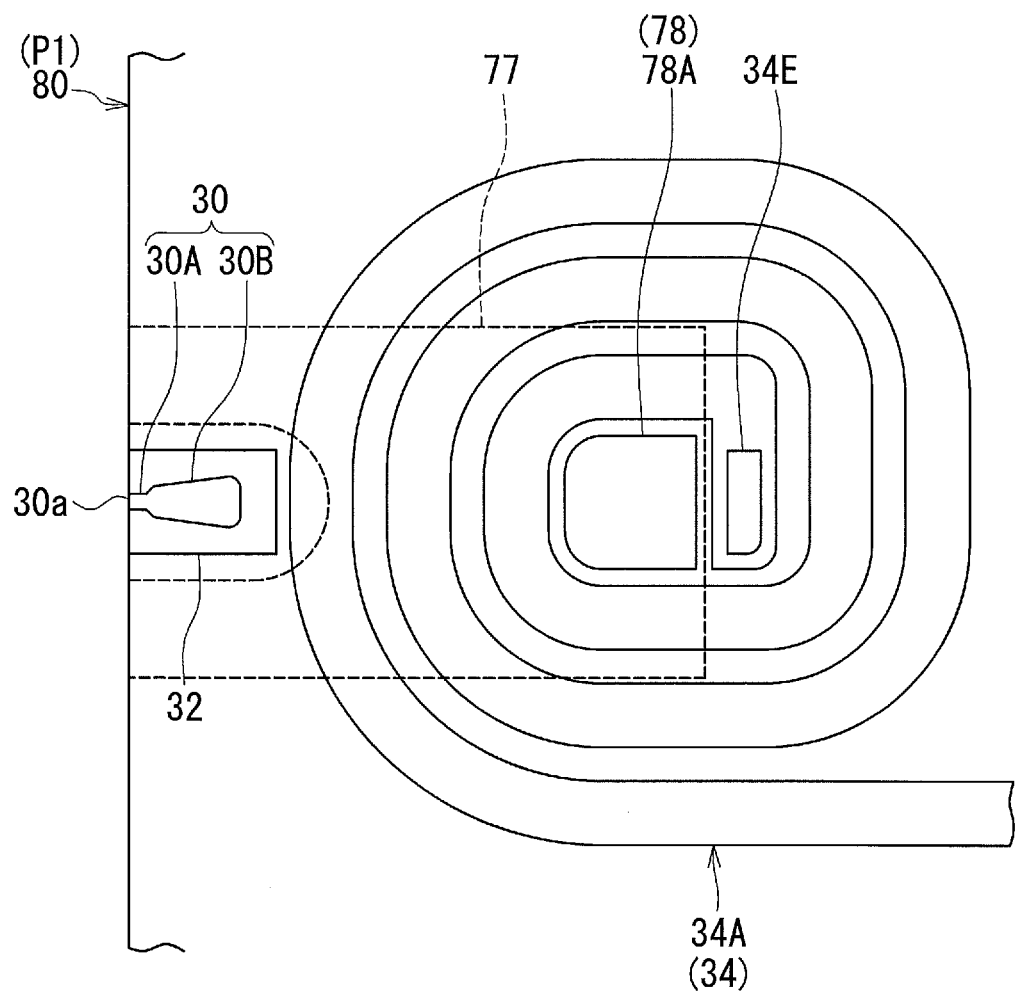
FIG. 37 is a plan view showing a first layer of a coil of the sixth embodiment of the invention.
Figure 37:
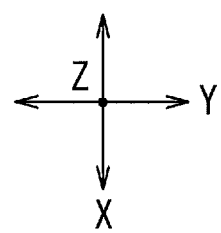
Figure 38:
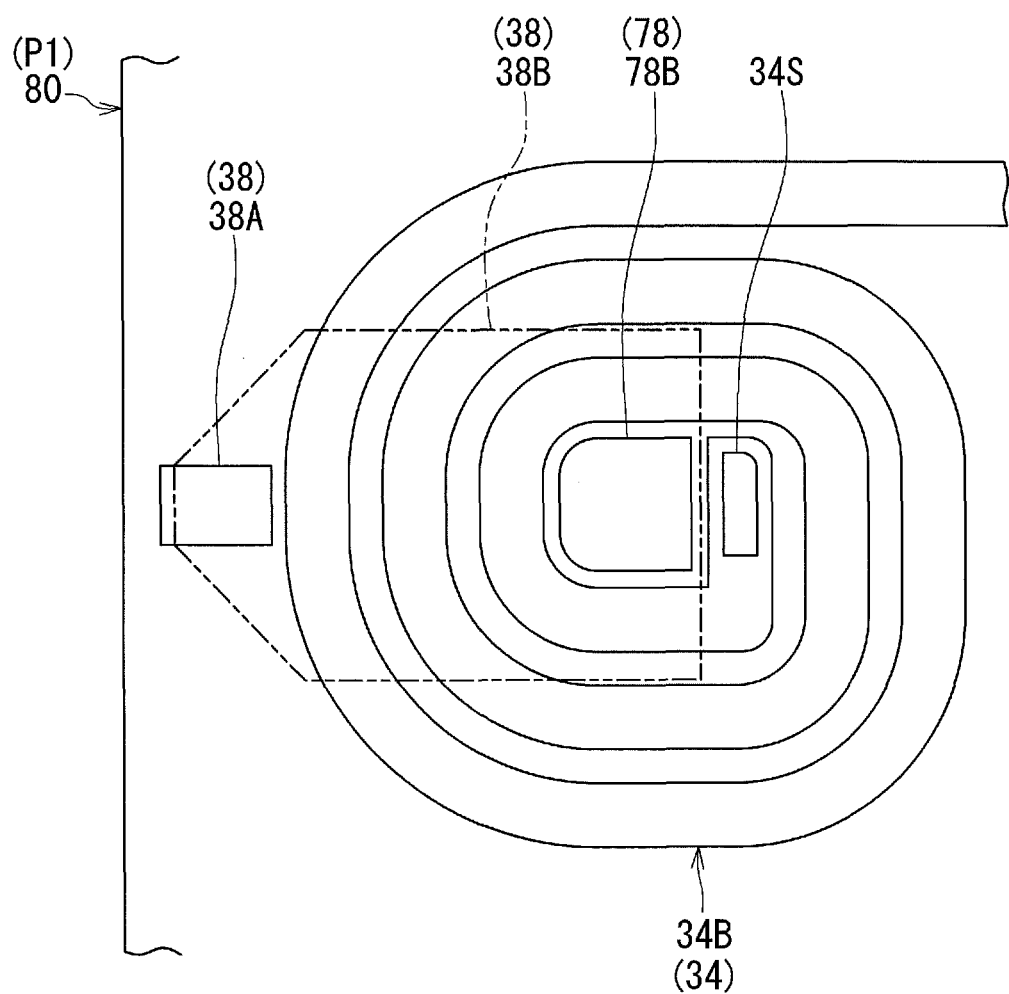
FIG. 38 is a plan view showing a second layer of the coil of the sixth embodiment of the invention.

A thermally-assisted magnetic recording head according to a sixth embodiment of the invention will now be described with reference to FIG. 34 to FIG. 38. FIG. 34 is a perspective view showing the main part of the thermally-assisted magnetic recording head. FIG. 35 is a cross-sectional view showing the configuration of the thermally-assisted magnetic recording head. FIG. 36 is a front view showing the medium facing surface of the thermally-assisted magnetic recording head. FIG. 37 is a plan view showing a first layer of the coil of the present embodiment. FIG. 38 is a plan view showing a second layer of the coil of the present embodiment.

The thermally-assisted magnetic recording head according to the present embodiment is configured differently than in the first embodiment in the following ways. The thermally-assisted magnetic recording head according to the present embodiment includes a shield 71 formed of a magnetic material, in place of the shield 17. Further, the components of the return path section R of the first embodiment other than the first yoke portion 38, that is, the return pole layer 11, the coupling layers 12, 13, 33 and 39, the first coupling sections 15A and 15B, and the second coupling sections 16A and 16B, are eliminated from the present embodiment. Instead, the return path section R of the present embodiment includes a second yoke portion 77A, a first columnar portion 78, a second columnar portion 73, and a third columnar portion 74. Further, the present embodiment is not provided with the insulating layer 14 and the non-illustrated insulating layer around the return pole layer 11.

The shield 71 lies on the nonmagnetic layer 10. As shown in FIG. 34, the shield 71 has an end face 71a located in the medium facing surface 80, a rear end face 71b located opposite to the end face 71a, and a top surface 71c. The end face 30a of the main pole 30 and the end face 71a of the shield 71 are at locations different from each other in the direction of travel of the recording medium 90. In the present embodiment, the end face 71a of the shield 71 is located on the rear side in the direction of travel of the recording medium 90 relative to the end face 30a of the main pole 30.

The shield 71 includes a central portion 71A, a first side portion 71B and a second side portion 71C, the first and second side portions 71B and 71C being located on opposite sides of the central portion 71A in the track width direction (the X direction). The length of the central portion 71A in the direction perpendicular to the medium facing surface 80 is constant regardless of position along the track width direction. The maximum length of each of the side portions 71B and 71C in the direction perpendicular to the medium facing surface 80 is greater than the length of the central portion 71A in that direction.

The thermally-assisted magnetic recording head according to the present embodiment includes an insulating layer 72 lying on the nonmagnetic layer 10 and surrounding the shield 71. The insulating layer 72 is formed of alumina, for example.

The thermally-assisted magnetic recording head according to the present embodiment further includes a magnetic layer 77 formed of a magnetic material. The magnetic layer 77 is embedded in the cladding layer 22 and the dielectric layers 23, 24, 26 and 28. The magnetic layer 77 is located at a predetermined distance from the main pole 30.

As shown in FIG. 34, the magnetic layer 77 has a front end face 77a facing toward the medium facing surface 80, a bottom surface 77b, and a top surface 77c. The front end face 77a of the magnetic layer 77 includes a first portion 77a1, a second portion 77a2 and a third portion 77a3, the second and third portions 77a2 and 77a3 being located on opposite sides of the first portion 77a1 in the track width direction. The first portion 77a1 is shaped to be recessed such that the center of the first portion 77a1 in the track width direction is farthest from the medium facing surface 80. The first portion 77a1 is disposed to surround the main pole 30. The second and third portions 77a2 and 77a3 are located in the medium facing surface 80.

The magnetic layer 77 includes the second yoke portion 77A as its main portion. The magnetic layer 77 further includes two coupling sections 77B and 77C coupled to the second yoke portion 77A, the two coupling sections 77B and 77C being located on opposite sides of the main pole 30 and the plasmon generator 50 in the track width direction in the vicinity of the medium facing surface 80. In FIG. 34, the boundaries between the second yoke portion 77A and the coupling sections 77B and 77C are indicated by dotted lines. The coupling section 77B includes the second portion 77a2 of the front end face 77a. The coupling section 77C includes the third portion 77a3 of the front end face 77a.

The thermally-assisted magnetic recording head according to the present embodiment further includes two magnetic layers 75 and 76 each formed of a magnetic material. The magnetic layers 75 and 76 are located on opposite sides of the core 20 in the track width direction in the vicinity of the medium facing surface 80. The magnetic layers 75 and 76 penetrate the cladding layers 19 and 21 and connect the shield 71 and the magnetic layer 77 to each other.

Each of the magnetic layers 75 and 76 has a front end face located in the medium facing surface 80, a top surface, and a bottom surface. The bottom surface of the magnetic layer 75 is in contact with a portion of the top surface 71c of the shield 71 that is included in the first side portion 71B. The bottom surface of the magnetic layer 76 is in contact with a portion of the top surface 71c of the shield 71 that is included in the second side portion 71C. The top surface of the magnetic layer 75 is in contact with a portion of the bottom surface 77b of the magnetic layer 77 that is included in the coupling section 77B. The top surface of the magnetic layer 76 is in contact with a portion of the bottom surface 77b of the magnetic layer 77 that is included in the coupling section 77C.

The second columnar portion 73 is constituted by the magnetic layer 75 and the coupling section 77B of the magnetic layer 77. The third columnar portion 74 is constituted by the magnetic layer 76 and the coupling section 77C of the magnetic layer 77. As shown in FIGS. 34 and 36, the second columnar portion 73 and the third columnar portion 74 are located on opposite sides of the main pole 30 and the plasmon generator 50 in the track width direction and spaced from the main pole 30 and the plasmon generator 50.

As described above, since each of the magnetic layers 75 to 77 is formed of magnetic metal, each of the second and third columnar portions 73 and 74 is also formed of magnetic metal.

The first columnar portion 78 has a first end 78a and a second end 78b located opposite to each other in the direction of travel of the recording medium 90. In the present embodiment, the first end 78a lies at the trailing-side end of the first columnar portion 78, i.e., the front-side end of the first columnar portion 78 in the direction of travel of the recording medium 90, whereas the second end 78b lies at the leading-side end of the first columnar portion 78, i.e., the rear-side end of the first columnar portion 78 in the direction of travel of the recording medium 90.

The first columnar portion 78 includes a first layer 78A and a second layer 78B. The first layer 78A includes the second end 78b and lies on a portion of the top surface 77c of the magnetic layer 77 at a location farther from the medium facing surface 80 than the main pole 30. The second layer 78B includes the first end 78a and lies on the first layer 78A.

In the present embodiment, the first layer 34A of the coil 34 is wound around the first layer 78A of the first columnar portion 78. The insulating film 35 is interposed between the first layer 34A and the first layer 78A. The second layer 34B of the coil 34 is wound around the second layer 78B of the first columnar portion 78. The insulating film 40 is interposed between the second layer 34B and the second layer 78B. The second layer 38B of the first yoke portion 38 lies on the first layer 38A of the first yoke portion 38, the second layer 78B of the first columnar portion 78 and the insulating layer 42.

As has been described, the return path section R of the present embodiment includes the first yoke portion 38, the second yoke portion 77A, the first columnar portion 78, the second columnar portion 73, and the third columnar portion 74. As shown in FIGS. 34 and 35, the first yoke portion 38, the second yoke portion 77A and the first columnar portion 78 are located on the same side in the direction of travel of the recording medium 90 relative to the core 20. In the present embodiment, the first yoke portion 38, the second yoke portion 77A and the first columnar portion 78 are located on the trailing side, i.e., the front side in the direction of travel of the recording medium 90, relative to the core 20. The first columnar portion 78 has the first end 78a and the second end 78b, and is located away from the medium facing surface 80. As shown in FIG. 34, the second and third columnar portions 73 and 74 are located closer to the medium facing surface 80 than is the first columnar portion 78.

The first yoke portion 38 connects the main pole 30 to the first end 78a of the first columnar portion 78. The second columnar portion 73 and the third columnar portion 74 are located on opposite sides of the plasmon generator 50 in the track width direction and are connected to the shield 71. The second yoke portion 77A is connected to the second end 78b of the first columnar portion 78, and is connected to the shield 71 via the second and third columnar portions 73 and 74.

The shield 71 has the same functions as those of the shield 17 described in the first embodiment section. Specifically, the shield 71 has the functions of: capturing a disturbance magnetic field applied to the thermally-assisted magnetic recording head from the outside thereof; capturing a magnetic flux that is produced from the end face 30a of the main pole 30 and spreads in directions other than the direction perpendicular to the plane of the recording medium 90, and thereby preventing the magnetic flux from reaching the recording medium 90; and allowing a magnetic flux that has been produced from the end face 30a of the main pole 30 and has magnetized a portion of the recording medium 90 to flow back to the main pole 30.

As shown in FIG. 37, the first layer 34A of the coil 34 is wound approximately three times around the first layer 78A of the first columnar portion 78. As shown in FIG. 38, the second layer 34B of the coil 34 is wound approximately three times around the second layer 78B of the first columnar portion 78.

The specific functions and effects of the thermally-assisted magnetic recording head according to the present embodiment will now be described. In the present embodiment, the near-field light generating surface 52a of the front protrusion 52 of the plasmon generator 50 is located between the end face 30a of the main pole 30 and the end face 71a of the shield 71. A portion of the core 20 is located in the vicinity of the plasmon generator 50. The core 20 and the return path section R are configured to intersect each other without contacting each other. More specifically, the second and third columnar portions 73 and 74 of the return path section R are located on opposite sides of the core 20 in the track width direction without contacting the core 20.

In the present embodiment, the first yoke portion 38, the second yoke portion 77A and the first columnar portion 78 are located on the same side in the direction of travel of the recording medium 90 relative to the core 20, and the coil 34 is wound around the first columnar portion 78. The present embodiment allows the first columnar portion 78 to be small in width in the track width direction regardless of distance between the respective outer ends of the second and third columnar portions 73 and 74 in the track width direction. The present embodiment thus allows the coil 34 to be smaller in entire length and accordingly lower in resistance when compared with the first embodiment.

The plasmon generator 50 in the present embodiment may have the same shape as in any of the second to fifth embodiments. The remainder of configuration, function and effects of the present embodiment are similar to those of any of the first to fifth embodiments.

The present invention is not limited to the foregoing embodiments, and various modifications may be made thereto. For example, as far as the requirements of the appended claims are met, the main body 51 and the front protrusion 52 of the plasmon generator 50 may be shaped as desired, and need not necessarily be shaped as in the respective examples illustrated in the foregoing embodiments.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A plasmon generator comprising a main body, and a front protrusion protruding from the main body, wherein
   the front protrusion has a proximal portion which is a boundary with the main body, and a near-field light generating surface which is a protruding end,
   the main body has a first inclined surface and a second inclined surface each facing toward a first imaginary plane including the near-field light generating surface,
   the first inclined surface and the second inclined surface are at a distance from each other and aligned in a first direction parallel to the first imaginary plane,
   each of the first inclined surface and the second inclined surface has a first edge located at a smallest distance from the first imaginary plane, and a second edge located at a largest distance from the first imaginary plane,
   the first edge and the second edge of each of the first and second inclined surfaces are both straight-line shaped,
   an entirety of the first edge of the first inclined surface and an entirety of the first edge of the second inclined surface are located on a first imaginary straight line extending in the first direction,
   an entirety of the second edge of the first inclined surface and an entirety of the second edge of the second inclined surface are located on a second imaginary straight line extending in the first direction,
   each of the first inclined surface and the second inclined surface is inclined with respect to both of the first imaginary plane and a second imaginary plane, the second imaginary plane including the first imaginary straight line and being perpendicular to the first imaginary plane,
   the proximal portion of the front protrusion is located between the first inclined surface and the second inclined surface, and
   the plasmon generator is configured to excite a surface plasmon on the main body based on light, and to generate near-field light from the near-field light generating surface of the front protrusion based on the surface plasmon.

2. The plasmon generator according to claim 1, wherein the main body has a top surface, and a plasmon exciting section located opposite to the top surface, the top surface including the second edge of each of the first and second inclined surfaces, the plasmon exciting section being configured to excite the surface plasmon thereon.

3. The plasmon generator according to claim 2, wherein
   the main body includes a lower protrusion located on a side of the second imaginary plane opposite from the top surface, and
   the lower protrusion includes the plasmon exciting section, and has a front end face facing toward the first imaginary plane and not included in the first imaginary plane.

4. The plasmon generator according to claim 3, wherein
   the front end face of the lower protrusion is inclined with respect to both of the first imaginary plane and the second imaginary plane, and
   the front end face has a third edge located at a smallest distance from each of the first imaginary plane and the second imaginary plane, and a fourth edge located at a largest distance from each of the first imaginary plane and the second imaginary plane.

5. The plasmon generator according to claim 3, wherein the front end face of the lower protrusion is parallel to the first imaginary plane.

6. The plasmon generator according to claim 1, wherein the first imaginary straight line is located at a distance from the first imaginary plane.

7. The plasmon generator according to claim 1, wherein the first imaginary straight line is included in the first imaginary plane.

8. The plasmon generator according to claim 1, wherein a straight line that connects two points on each of the first and second inclined surfaces forms an angle of 30° to 70° with respect to the second imaginary plane, the two points being located in a third imaginary plane perpendicular to the first imaginary plane and the second imaginary plane.

9. The plasmon generator according to claim 1, wherein each of the first and second inclined surfaces is a single plane.

10. The plasmon generator according to claim 1, wherein each of the first and second inclined surfaces includes a plurality of planar portions that form different angles with respect to the second imaginary plane.

11. The plasmon generator according to claim 1, wherein at least part of each of the first and second inclined surfaces is curved.

12. A thermally-assisted magnetic recording head comprising:
    a medium facing surface configured to face a recording medium;
    a coil for producing a magnetic field corresponding to data to be written on the recording medium;
    a main pole having an end face located in the medium facing surface;
    a waveguide including a core and a cladding, the core allowing light to propagate therethrough, the cladding being provided around the core; and
    the plasmon generator according to claim 1, wherein
    the main pole is configured to pass a magnetic flux corresponding to the magnetic field produced by the coil, and to produce from the end face a write magnetic field for use to write the data on the recording medium, the near-field light generating surface of the front protrusion of the plasmon generator is located in the medium facing surface, the medium facing surface is included in the first imaginary plane, and the plasmon generator is configured to excite the surface plasmon on the main body based on the light propagating through the core.

13. The thermally-assisted magnetic recording head according to claim 12, wherein the core has an evanescent light generating surface for generating evanescent light based on the light propagating through the core, the main body of the plasmon generator has a top surface, and a plasmon exciting section located opposite to the top surface, the top surface including the second edge of each of the first and second inclined surfaces, the plasmon exciting section facing the evanescent light generating surface with a predetermined spacing therefrom, and the plasmon exciting section is configured so that a surface plasmon is excited on the plasmon exciting section through coupling with the evanescent light generated by the evanescent light generating surface.

14. The thermally-assisted magnetic recording head according to claim 13, wherein the main body of the plasmon generator includes a lower protrusion located on a side of the second imaginary plane opposite from the top surface, and the lower protrusion includes the plasmon exciting section, and has a front end face facing toward the first imaginary plane and not included in the first imaginary plane.

15. A method of manufacturing the plasmon generator of claim 1, comprising the steps of:

forming an initial plasmon generator;

forming a first mask on the initial plasmon generator, the first mask being intended for defining the width of the front protrusion in the first direction;

forming a second mask on the initial plasmon generator and the first mask, the second mask being intended for defining the location of the first and second inclined surfaces;

etching the initial plasmon generator using the first and second masks so that the first and second inclined surfaces and an initial front protrusion are formed; and forming the near-field light generating surface so that the initial front protrusion becomes the front protrusion and the initial plasmon generator becomes the plasmon generator.

16. The method of manufacturing the plasmon generator according to claim 15, wherein the main body has a top surface, and a plasmon exciting section located opposite to the top surface, the top surface including the second edge of each of the first and second inclined surfaces, the plasmon exciting section being configured to excite a surface plasmon thereon.

17. The method of manufacturing the plasmon generator according to claim 16, wherein the main body includes a lower protrusion located on a side of the second imaginary plane opposite from the top surface, the lower protrusion includes the plasmon exciting section, and has a front end face facing toward the first imaginary plane and not included in the first imaginary plane, the initial plasmon generator is formed to include an initial lower protrusion which will later become the lower protrusion, the initial lower protrusion has an initial front end face which will later become the front end face, the method of manufacturing the plasmon generator further comprises the step of forming an underlying section before the initial plasmon generator is formed, the underlying section includes a base portion, and an upward protrusion protruding upward from the base portion, the base portion has a top surface, the upward protrusion has a reference surface, and the initial plasmon generator is formed over the base portion and the upward protrusion of the underlying section such that the plasmon exciting section contacts the top surface of the base portion and the initial front end face contacts the reference surface of the upward protrusion.

18. The method of manufacturing the plasmon generator according to claim 17, wherein the reference surface of the upward protrusion has at least one edge parallel to the first imaginary plane, and in the step of etching the initial plasmon generator, the location of at least one of the first and second edges of each of the first and second inclined surfaces is controlled by using the at least one edge of the reference surface of the upward protrusion as a reference.

19. The method of manufacturing the plasmon generator according to claim 15, further comprising the step of forming an indicator before the initial plasmon generator is formed, wherein the indicator is located at a predetermined distance of zero or more from the first imaginary plane, and in the step of etching the initial plasmon generator, the location of at least one of the first and second edges of each of the first and second inclined surfaces is controlled by using the indicator as a reference.

20. The method of manufacturing the plasmon generator according to claim 15, wherein the step of etching the initial plasmon generator employs ion beam etching to etch the initial plasmon generator.

* * * * *